(12) United States Patent
Campalans et al.

(10) Patent No.: US 9,792,748 B2
(45) Date of Patent: Oct. 17, 2017

(54) NEUTRAL ATMOSPHERE AND SANITIZATION STORAGE APPARATUS, METHOD AND SYSTEM

(71) Applicants: Alfonso Campalans, Houston, TX (US); Alexander Gray, Houston, TX (US)

(72) Inventors: Alfonso Campalans, Houston, TX (US); Alexander Gray, Houston, TX (US)

( * ) Notice: Subject to any disclaimer, the term of this patent is extended or adjusted under 35 U.S.C. 154(b) by 0 days.

(21) Appl. No.: 15/287,375

(22) Filed: Oct. 6, 2016

(65) Prior Publication Data

US 2017/0096279 A1    Apr. 6, 2017

Related U.S. Application Data

(60) Provisional application No. 62/237,929, filed on Oct. 6, 2015.

(51) Int. Cl.

| | |
|---|---|
| *B65D 81/24* | (2006.01) |
| *G07C 9/00* | (2006.01) |
| *H04L 29/06* | (2006.01) |
| *B65D 81/20* | (2006.01) |
| *H04W 4/00* | (2009.01) |
| *H04L 29/08* | (2006.01) |

(52) U.S. Cl.
CPC ..... *G07C 9/00896* (2013.01); *B65D 81/2076* (2013.01); *H04L 67/42* (2013.01); *G07C 2009/0092* (2013.01); *H04L 67/1097* (2013.01); *H04W 4/008* (2013.01)

(58) Field of Classification Search
CPC .......................... B65D 81/24; B65D 81/2076
See application file for complete search history.

(56) References Cited

U.S. PATENT DOCUMENTS

| | | |
|---|---|---|
| 5,405,631 A | 4/1995 | Rosenthal |
| 6,120,822 A | 9/2000 | Denvir et al. |
| 6,132,629 A | 10/2000 | Boley |
| 6,387,430 B1 | 5/2002 | Gillette et al. |
| 6,455,017 B1 | 9/2002 | Kasting et al. |
| 6,685,549 B2 | 2/2004 | Henry et al. |
| 6,942,834 B2 | 9/2005 | Gutman |
| 8,017,074 B2 | 9/2011 | Arnold et al. |
| 8,062,500 B2 | 11/2011 | Sumita |
| 8,278,628 B2 | 10/2012 | Hamilton |
| 8,349,253 B2 | 1/2013 | Gutman |
| 8,425,837 B2 | 4/2013 | Carbone et al. |
| 8,540,943 B2 | 9/2013 | Kee et al. |
| 8,617,479 B2 | 12/2013 | Gil et al. |

(Continued)

*Primary Examiner* — Sean E Conley
(74) *Attorney, Agent, or Firm* — Sean Christian Connolly

(57) ABSTRACT

Disclosed herein are an apparatus, method and system for storing perishable items that degrade in the presence of oxygen and/or humidity and that are frequently accessed by a consumer. The apparatus comprises an openable vessel, which becomes airtight when closed, and an UV light source and fan within the airtight enclosure, which converts ambient oxygen trapped within the airtight enclosure into ozone by circulating the enclosed volume of air around the UV light source after the vessel is opened and then closed. The apparatus is network connected to allow for remote control and monitoring and sends alerts to web applications or mobile applications when monitored parameters substantially vary from their settings.

20 Claims, 29 Drawing Sheets

(56) References Cited

U.S. PATENT DOCUMENTS

| | | |
|---|---|---|
| 8,721,984 B2 | 5/2014 | Carbone et al. |
| 8,754,385 B1 | 6/2014 | Gutman |
| 8,808,622 B2 | 8/2014 | Arnold et al. |
| 9,034,271 B2 * | 5/2015 | Shur .................. A61L 2/10 422/186.3 |
| 2009/0252646 A1 | 10/2009 | Holden et al. |
| 2009/0272279 A1 * | 11/2009 | Kieck .................. A47J 47/10 99/468 |
| 2009/0274577 A1 | 11/2009 | Sorensen et al. |
| 2009/0304810 A1 | 12/2009 | Martin |
| 2010/0192987 A1 | 8/2010 | Steffen |
| 2011/0268850 A1 | 11/2011 | Rasanayagam et al. |
| 2012/0021075 A1 | 1/2012 | Umanskaya et al. |
| 2012/0198870 A1 | 8/2012 | Erbs et al. |
| 2012/0230879 A1 | 9/2012 | Dunkley et al. |
| 2014/0287068 A1 | 9/2014 | Lewis et al. |

\* cited by examiner

NEUTRAL ATMOSPHERE AND SANITIZATION STORAGE APPARATUS, METHOD AND SYSTEM

CROSS-REFERENCE TO RELATED APPLICATIONS

This application claims benefit of U.S. Provisional Patent Application No. 62/237,929, which was filed on Oct. 6, 2015, and which is incorporated herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of containers. More particularly, the preferred embodiments of the present invention relate generally to storage containers. More particularly, the preferred embodiments of the present invention relate generally to storage container for perishable items. More particularly, the preferred embodiments of the present invention relate generally to storage containers for perishable items that degrade over time when exposed to oxygen due to natural decay. More particularly, the preferred embodiments of the present invention relate generally to storage containers for perishable items that degrade when exposed to oxygen, which are frequently accessed. More particularly, the preferred embodiments of the present invention relate generally to frequently accessed storage containers for perishable items that degrade when exposed to oxygen, which use ozone. More particularly, the preferred embodiments of the present invention relate generally to frequently accessed storage containers for perishable items that degrade when exposed to oxygen, which generate ozone. More particularly, the preferred embodiments of the present invention relate generally to frequently accessed storage containers for perishable items that degrade when exposed to oxygen, which generate ozone using ultraviolet (UV) light, as well as related methods and systems.

2. Description of the Related Art

The broad concept of storing products in a modified atmosphere is also known. However, these inventions usually involve injecting a modified atmosphere into packaging during manufacturing and are unable to replenish the modified atmosphere once the packaging seal is broken and are not well suited for frequently accessed items.

The broad concept of sanitization processes that use ozone is known. These sanitation processes often involve one-time treatment and are not well suited for repeatedly sanitizing items that are frequently used using gaseous applications.

It is also known to use sanitization processes that generate ozone using an ultraviolet light source. However, these sanitation processes are not incorporated into storage containers that allow for frequent access and frequent sanitation.

SUMMARY OF THE INVENTION

Particular problems arise in the commercialization of perishable items that degrade in the presence of oxygen, including issues with storage and transportation. Similar issues arise with perishable items that are prone to fungal growth in humid environments. Perishable items that are frequently used by consumers experience increased exposure to oxygen ($O_2$) and/or humid environments each time that the perishable items are accessed and removed from their storage container. This increased exposure can accelerate degradation in the quality of the perishable items. Similarly, stress during transportation, including exposure to oxygen, humidity and pressure variances, can reduce the quality of perishable items, which has a negative impact on their value. Because of these susceptibilities, the challenge presented is to develop a method, system and apparatus for storing perishable items, which would allow for regular and frequent access, as well as long-term storage and transportation, while maintaining high quality, and while providing for integrated monitoring, tracking and reporting.

In broad embodiment, the present invention relates to storage containers for storing perishable items that degrade in the presence of oxygen and/or humidity and that are frequently accessed by a consumer; which comprise an openable vessel, which becomes airtight when closed, and an UV light source and fan within the airtight enclosure, which converts ambient oxygen trapped within the airtight enclosure into ozone by circulating the enclosed volume of air around the UV light source after the vessel is opened and then closed; as well as, methods and systems for using the same. Additionally, the present invention incorporates the use and control of dynamic humidity control systems and temperature control systems, which can be monitored and controlled to optimize the conditions for storage of the particular biomass.

In more preferred embodiments, the present invention relates to storage containers for storing perishable items that degrade in the presence of oxygen and/or humidity and that are frequently accessed by a consumer; which comprise an openable vessel that becomes airtight when closed, a processor module, and a UV light source, a fan, and one or more sensors within the airtight enclosure; as well as, methods and systems for using the same. The one or more sensors in the airtight enclosure relay data measured from the atmosphere within the airtight vessel, such as temperature, humidity, pressure, weight of the perishable items, time of last access (such as the last time the airtight vessel was opened and closed), ozone saturation, or the like, to the processor module, and, when the data measured within the airtight vessel meet specified conditions, the processor module in turn activates the UV light source and fan, hereinafter referred to as the ozone generation cycle or ozone saturation process, thereby converting ambient oxygen trapped within the airtight enclosure into ozone by circulating the enclosed volume of air around the UV light source, until the one or more sensors relay data to the processor module that indicates conditions within the airtight vessel are appropriately sanitized, at which time the processor module deactivates the UV light source and fan until the next time the one or more sensors trigger another ozone generation cycle.

In more preferred embodiments, the present invention relates to an apparatus for storing perishable items that are frequently accessed the apparatus comprising: an outer shell assembly, the outer shell assembly comprising an access door, a remote controlled lock, the remote control lock being able to lock the access door, an exposure chamber, the exposure chamber being able to be accessed through the access door and the exposure chamber being airtight when the access door is closed, an electronics chamber, the electronics chamber comprising a vent to the exterior of the outer shell assembly, and an exterior indicator; a memory stored in non-transitory computer-readable medium; the memory comprising tables of optimal ozone saturation for the perishable items, optimal temperature levels for the perishable items and optimal humidity for the perishable items; a processor module, the processor module enclosed within the electronics chamber and the processor module capable of wireless communication, the processor module capable of controlling the remote controlled lock to lock or unlock the access door, the processor module comprising the computer-readable medium; a power supply module, the power supply module enclosed within the electronics chamber; a UV light source, the UV light source enclosed within the exposure chamber and the UV light source being controllable by the processor module; a perforated basket for storing the perishable items, the perforated basket enclosed within the exposure chamber and the perforated basket being sufficiently perforated to allow substantial air flow around the perishable items stored on the perforated basket; a UV barrier, the UV barrier enclosed within the exposure chamber between the UV light source and the perforated basket, the UV barrier comprising a material opaque to UV light; a fan, the fan enclosed within the exposure chamber and the fan controllable by the processor module; a temperature sensor, the temperature sensor enclosed within the exposure chamber and the temperature sensor being able to send measured temperature data to the processor module; a humidity sensor, the humidity sensor enclosed within the exposure chamber and the humidity sensor being able to send measured humidity data to the processor module; a humidity control unit, the humidity control unit enclosed within the exposure chamber and the humidity control unit controllable by the processor module; wherein the apparatus receives the perishable items on to the perforated basket while the access door is open; the processor module controls the remote controlled lock to lock the access door, thereby making the exposure chamber airtight; the processor module receives the measured temperature data from the temperature sensor; the processor module receives the measured humidity data from the humidity sensor; the processor module accesses the tables in the memory and retrieves a recipe based on the perishable items, the measured temperature data, and the measured humidity data; and the processor module activates the humidity control unit to achieve the optimal humidity for the perishable items; and the processor module activates the UV light source and the fan, for a time based on retrieved the recipe, to circulate ambient air within the exposure chamber around the UV light source in order to generate ozone within the exposure chamber in an amount sufficient to achieve the optimal ozone saturation and to substantially preserve the quality of the perishable items.

In more preferred embodiments, the present invention also relates to a method of storing, curing, and preserving perishable items that are frequently accessed, the method comprising: obtaining fresh the perishable items; providing a memory stored in non-transitory computer-readable medium; the memory comprising tables of optimal ozone saturation for the perishable items, optimal temperature levels for the perishable items and optimal humidity for the perishable items; providing a processor module, the processor module comprising the memory and the processor module being capable of wireless communication; enclosing the perishable items on a perforated basket within an airtight container along with a UV light source, a fan, a temperature sensor, a humidity sensor, a humidity control unit, and a UV barrier, which separates the perishable items from the UV light source; the UV light source, the humidity control unit, and the fan being controllable by the processor module; the temperature sensor being capable of sending measured temperature data to the processor module; and the humidity sensor being capable of sending measured humidity data to the processor module; identifying the perishable items to the processor module; measuring the temperature within the airtight container with the temperature sensor; sending the measured temperature data to the processor module; measuring the humidity within the airtight container with the humidity sensor; sending the measured humidity data to the processor module; accessing the tables in the memory with the processor module; converting the measured temperature data and the measured humidity data to a recipe based on the perishable items and the tables with the processor module; activating the UV light source and the fan, using the processor module, for a time based on the recipe; activating the humidity control unit for a time based on the recipe; and circulating ambient air within the exposure chamber around the UV light source in order to generate ozone within the airtight container in an amount sufficient to achieve the optimal ozone saturation and to substantially preserve the quality of the perishable items.

In the most preferred embodiments, the present invention relates to an apparatus, method and system for storing perishable items that degrade in the presence of oxygen and/or humidity, which comprises an openable and lockable outer shell assembly that encloses a processor module, a power supply module, and an inner box assembly with a UV light source, a UV barrier, a combined humidity and temperature sensor, a weight sensor, a fan, an inner tray in which to store perishable items, a heating element, a rehydration vaporizer, and an integrated tray scraper. The outer shell assembly comprises a shell body, an outer lid, and a cam lock assembly(ies). The shell body further comprises outer vents, which provide ventilation for the processor module and the power supply module, and is connected to the outer lid by a hinge. The outer lid further comprises an LED (light emitting diode) indicator, which may appear in the form of a logo. The cam lock assembly is capable of locking the outer shell to prevent unauthorized access to the inner box. The processor module is wirelessly networked and capable of connecting to network servers and communicating with web applications and/or applications on mobile platforms, such as smart phones or tablets via Wi-Fi or Bluetooth connections. Further, the processor module is capable of receiving information from the combined humidity and temperature sensor, directing the locking or unlocking of the outer shell, controlling the opening and closing of the airtight inner box, and coordinating the UV light source and fan, as well as, the dynamic humidity and temperature modules. Because of the amount of power required to produce ozone and to facilitate the frequent operation of the present invention, the power supply module operates on standard 120 VAC, although those familiar in the art will recognize that more powerful mobile power sources, such as batteries or the like, may be forthcoming. The inner box is openable and airtight when closed and comprises an inner lid, a UV light source, a UV barrier, a combined humidity and temperature sensor, a fan, an inner tray in which to store perishable items, and an integrated tray scraper. The inner lid is integrated into the outer lid of the outer shell assembly when the present invention is assembled and further comprises an LED pocket, an LED pocket cover, and wire channels. The LED pocket is controlled by the processor module, and may be used to indicate whether the UV light is activated or other useful information about the present invention. The LED pocket cover helps to scatter light from the LED pocket and through the LED indicator. The UV light source (UV-C class generating light element) is capable of converting ambient oxygen within the airtight inner box into ozone (the ozone saturation process) and is capable of being controlled by the processor module. The UV barrier prevents any perishable items being stored on the inner tray from being directly exposed to UV radiation while allowing the ambient oxygen within the airtight enclosure to be exposed to UV radiation so that the ambient oxygen may be converted into ozone. The combined humidity and temperature sensor, and its dynamic counterparts, monitor and control humidity and temperature to ensure optimum storage conditions. The weight sensor monitors the weight of the perishable items or biomass being stored to ensure optimum storage conditions. The box sensors and mechanisms relay all data and actions to the processor module, so that the data may be used by the control module, such as turning the UV light source on or off, activating hydration cycles, sending alerts or status updates, or the like. The fan circulates the ambient air within the inner box in order to maximize its exposure to UV radiation during the ozone saturation process. The inner tray holds perishable items within the inner box, so that the perishable items are protected from direct exposure to UV radiation during the ozone saturation process, and stores the perishable items in a region that is readily accessible when the inner lid is open. The integrated tray scraper allows for the inner tray to be easily cleaned from any residue deposited by any perishable items being stored within the inner box. Some units may replace the indicator light bar with an interactive touch screen control monitor, which is used as a physical end user interface on the unit. This monitor enables the user to check on status, assignment, networking connectivity, and unit access. Additionally, the present invention promoted the proper curing of perishable items or biomass that are stored with in the airtight container.

Still referring to the most preferred embodiment of the present invention, the Neutral Atmosphere and Sanitization Storage Apparatus is primarily controlled through a web application or a mobile application. During use, when the Neutral Atmosphere and Sanitization Storage Apparatus is opened to add or remove perishable items from the inner tray, any ozone contained within the apparatus immediately decays and is replaced by ambient air. Upon closing the Neutral Atmosphere and Sanitization Storage Apparatus, an airtight seal is created, which traps ambient air within a previously sanitized space. Generally, the processor module activates the UV light source for a period of time sufficient to convert a substantial amount of the ambient oxygen within the vessel into ozone (the ozone saturation process) and automatically turns off the UV light source when the vessel is opened. The time required to convert the oxygen in the vessel into ozone is a calculated period based on the efficiency of the UV light source, the interior volume of the airtight inner box and the concentration of ozone desired by the user. The duration and intervals of operation and saturation are all calculated and controlled with firmware keyed to proprietary tables. The ozone saturation process will not reactivate until the user activates it again or within a proprietarily specified number of days from the last opening of the box and adjusted to the specific conditions as set by the user. Germicidal treatments are all pre-calibrated proprietary treatments. Upon the completion of the ozone saturation process, the ultraviolet light will turn off and wait for the next cycle or for the owner to reactivate the ozone saturation process manually. Additionally, a user can customize and define the ozone saturation process cycles as they wish. To set up a customized cycle or activate the ozone saturation process manually, a web application or a mobile application is used, which interacts with the wirelessly networked processor module. After a user initially connects the system and enables network communications, the wirelessly networked processor module automatically seeks out a Wi-Fi network and connects with network servers. The user then creates login information, registers the apparatus, and sets preferences and alert settings for the apparatus. Network servers record settings and begins to monitor the system and maintain diagnostic records on all tracked elements, including, but not limited to, relative humidity, ozone generation cycles, temperature, access (opening/closing) of the system, dynamic humidity cycles run, temperature increases or decreases, or the like. All network encryption keys for end uses are stored by the end user on their systems and not on the network. The Neutral Atmosphere and Sanitization Storage Apparatus provides a cloud-based monitoring system for all diagnostics and alerts generated for all deployed systems. Using a web application on a desktop computer or a mobile application on a smart phone (iOS or android), a user may monitor and/or control various aspects of the Neutral Atmosphere and Sanitization Storage Apparatus, including, but not limited to, opening and closing the lid, locking and unlocking the apparatus, activating hydration or temperature cycles, initiating pre-programmed germicidal treatment cycles, monitoring the temperature and relative humidity (RH) within the airtight enclosure, recording the type of perishable items being stored, displaying or editing a user profile, accessing blogs or FAQs concerning recommendations for storing different types of perishable items, time, setting alerts, displaying the serial number or other identifying information of the apparatus, triggering a hard reset, activating off grid settings, or other custom attributes. A hard switch may reset the hardware and software. Manual activation is also possible when the apparatus is used off grid where wireless network connections are unavailable, and any data that is recorded while the apparatus is off grid is stored and then sent to the network servers when a network connection is later achieved. Some embodiments may comprise direct communication between the web application or the mobile application and the Neutral Atmosphere and Sanitization Storage Apparatus using a Bluetooth connection without changing network defaults for all communications and monitoring, and data collected during direct Bluetooth communications between the application and the Neutral Atmosphere and Sanitization Storage Apparatus are uploaded to the server network. In sum, the Neutral Atmosphere and Sanitation Storage apparatus provides a sophisticated device, which preserves the useful life and quality of perishable items that degrade in the presence of oxygen and/or humidity.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the preferred embodiments of an apparatus, system and method, for storing perishable items that are frequently accessed, which comprises a vessel, which is airtight when closed; a UV light source, which is capable of converting ambient oxygen contained within the vessel into ozone; a humidity control unit, which can adjust the humidity within the airtight vessel; a sensor array, which measures the conditions within the airtight vessel; a fan, and a wirelessly networked processor module, which controls the UV light source, humidity control unit, and fan, and which automatically turns off the ultraviolet light source when the vessel is opened. These embodiments are not intended to limit the scope of the present invention.

Figure 1:
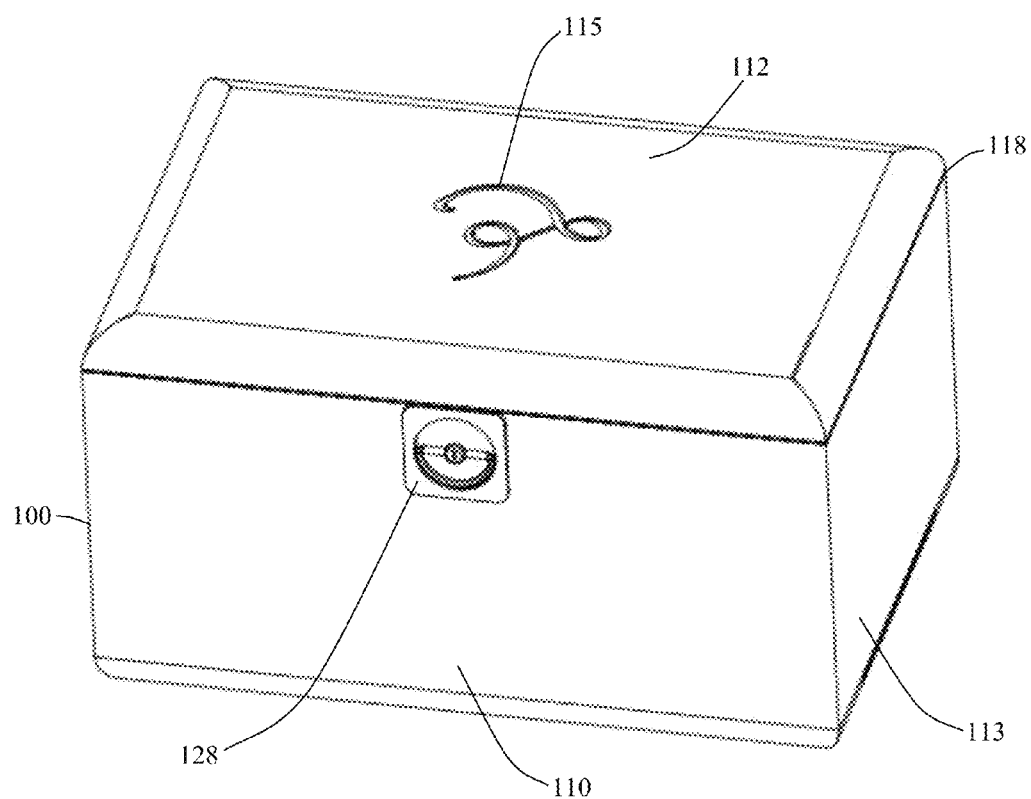
FIG. 1 is a perspective view of a preferred embodiment of an apparatus of the present invention.
Figure 2:
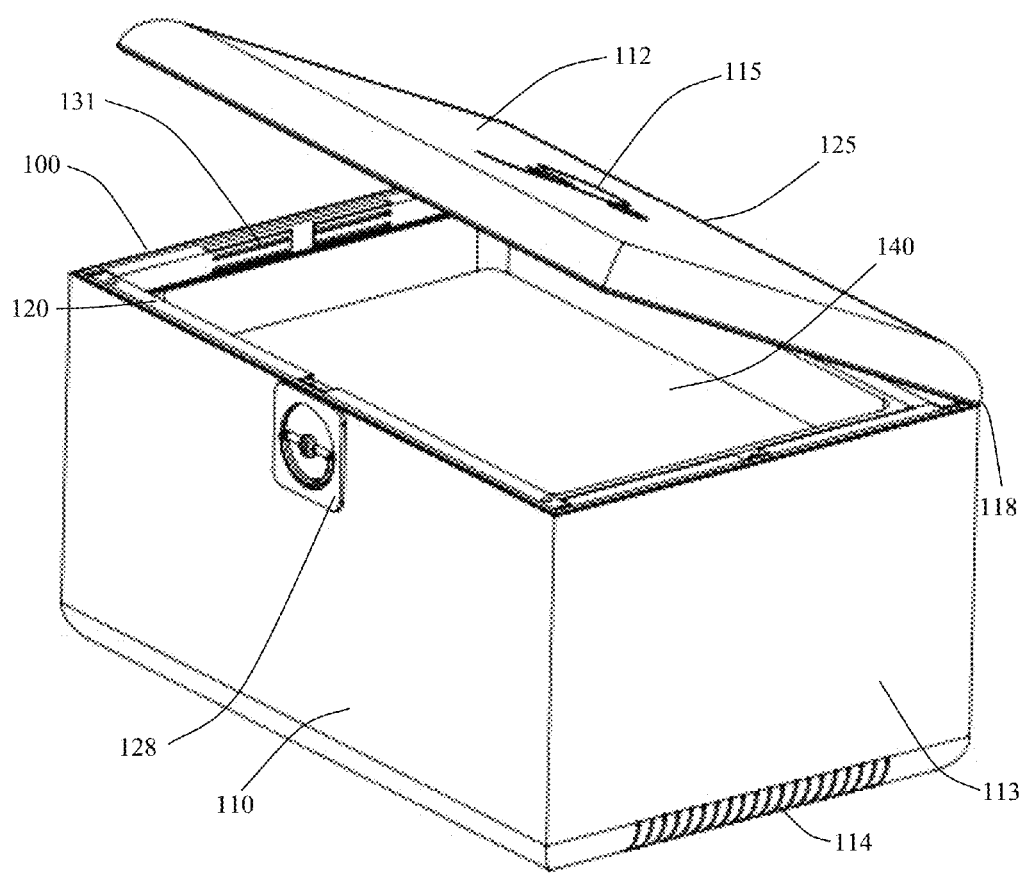
FIG. 2 is a perspective view of an apparatus of FIG. 1 with an open lid.
Figure 3:
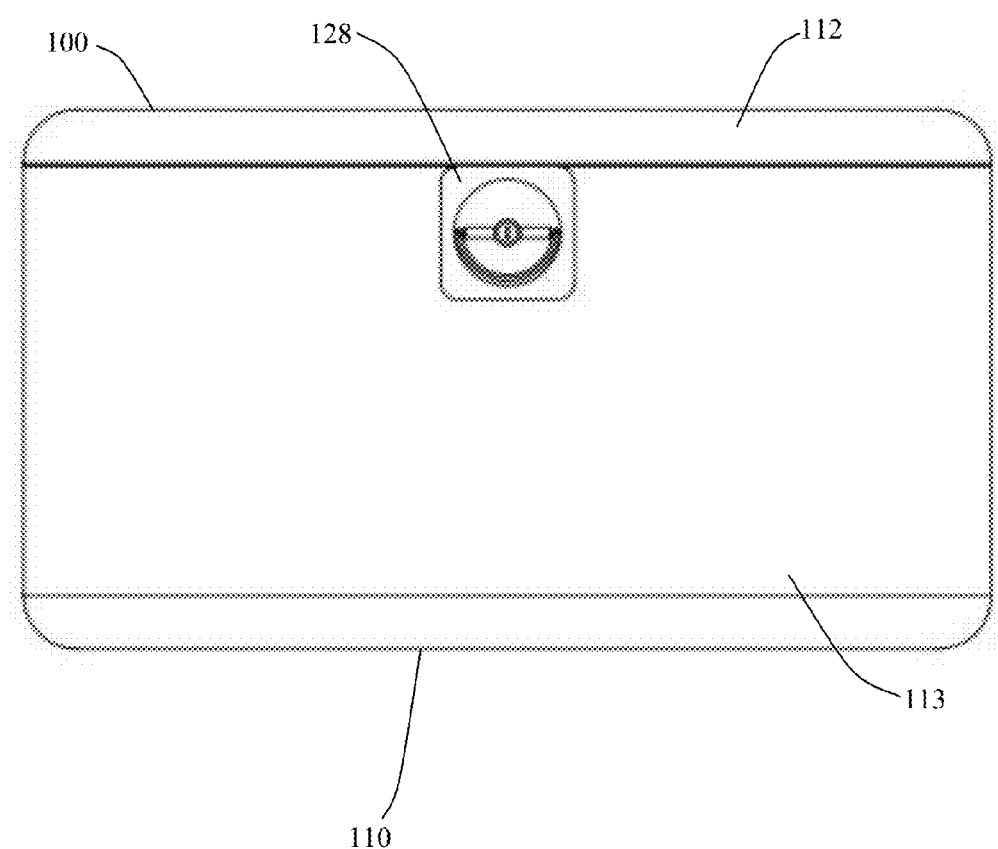
FIG. 3 is a front view of an apparatus of FIG. 1.
Figure 4:
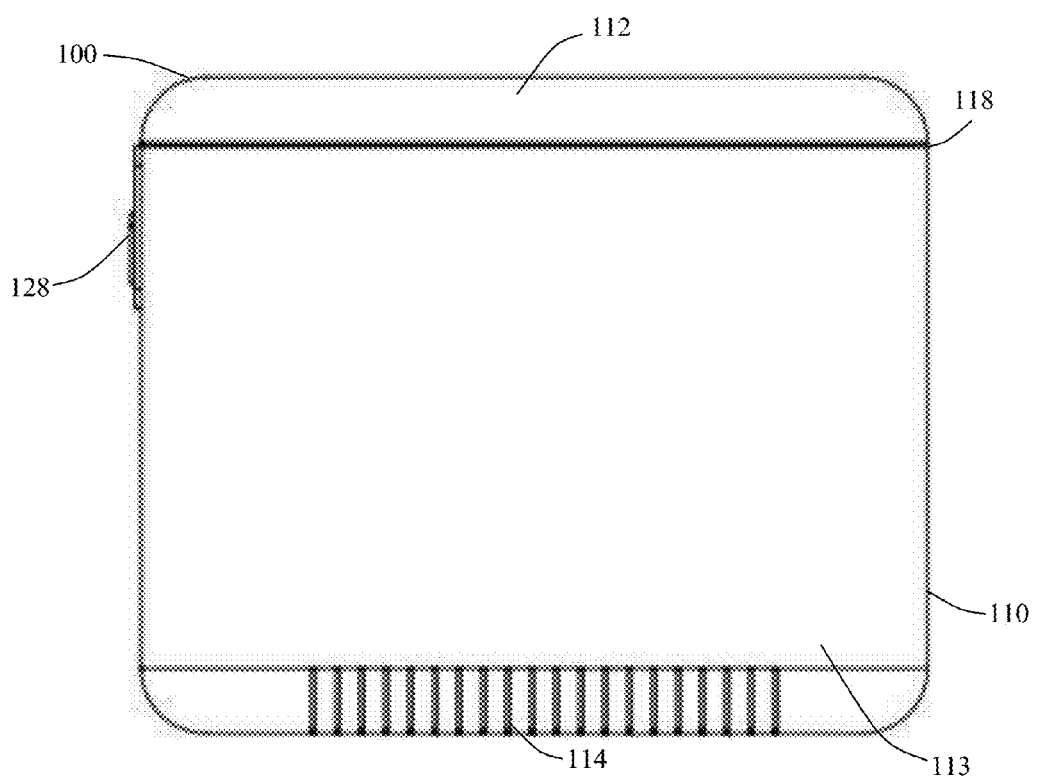
FIG. 4 is a side view of an apparatus of FIG. 1.
Figure 5:
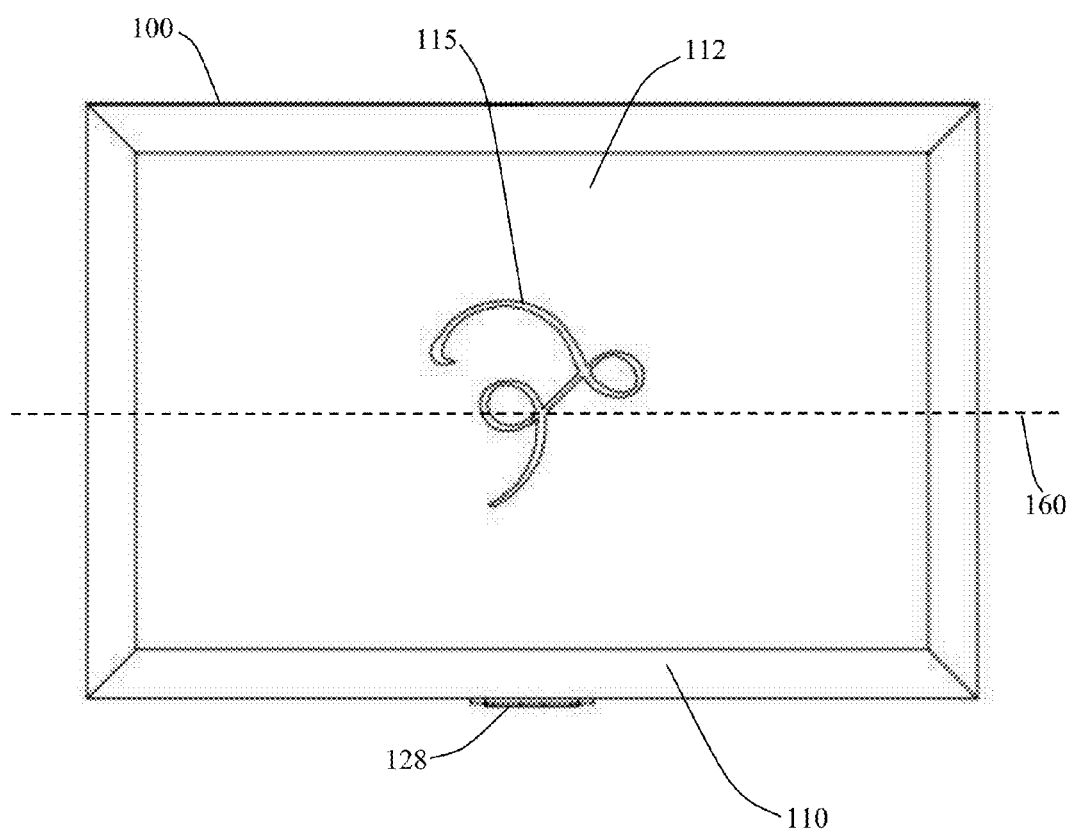
FIG. 5 is a top view of an apparatus of FIG. 1.
Figure 6:
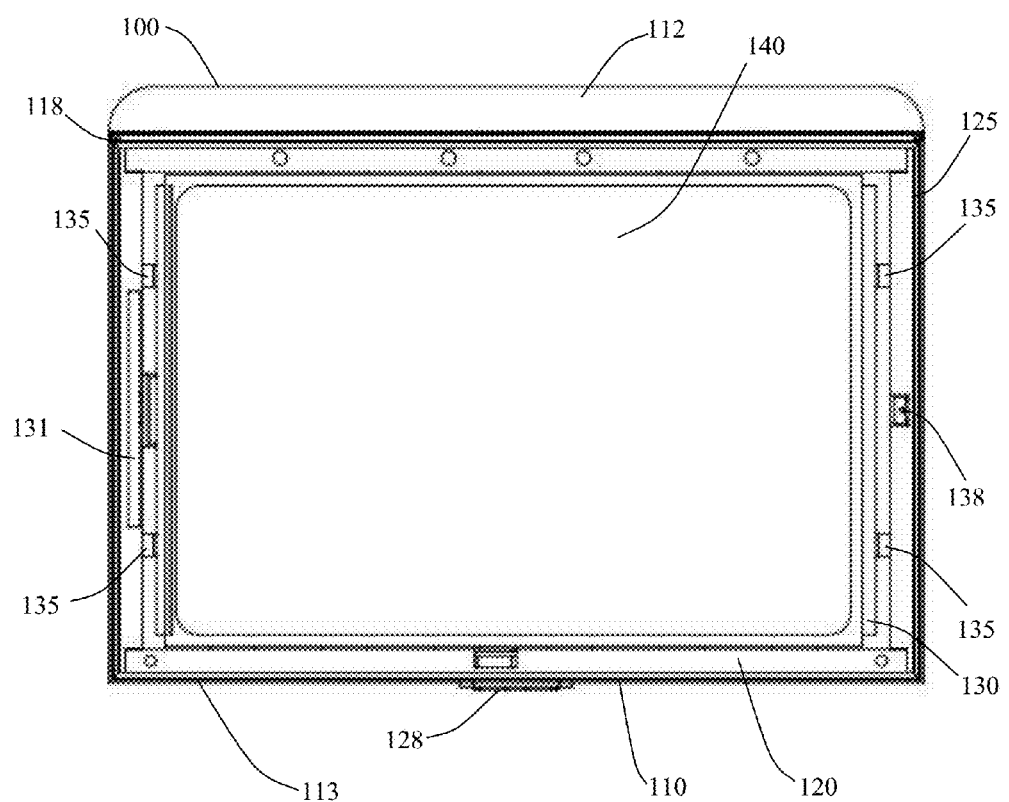
FIG. 6 is a top view of an apparatus of FIG. 1 with an opened lid.
Figure 7:
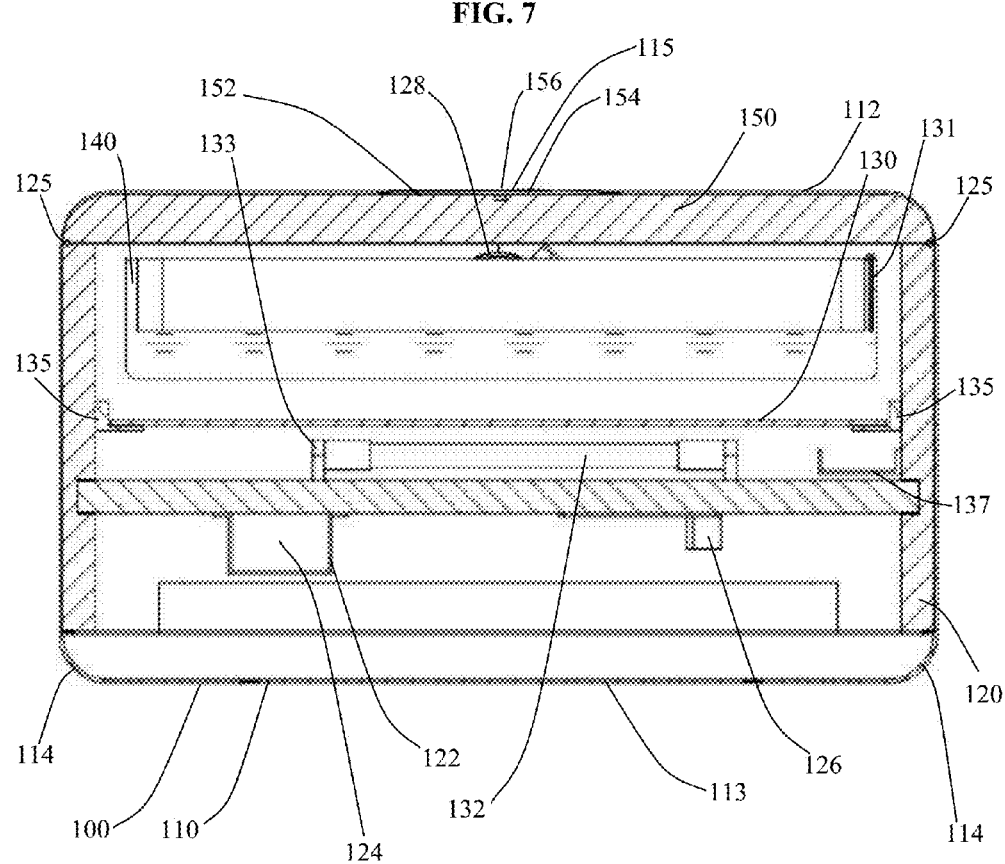
FIG. 7 is a rear cutaway view of an apparatus of FIG. 5, showing the interior of the present invention.
Figure 8:
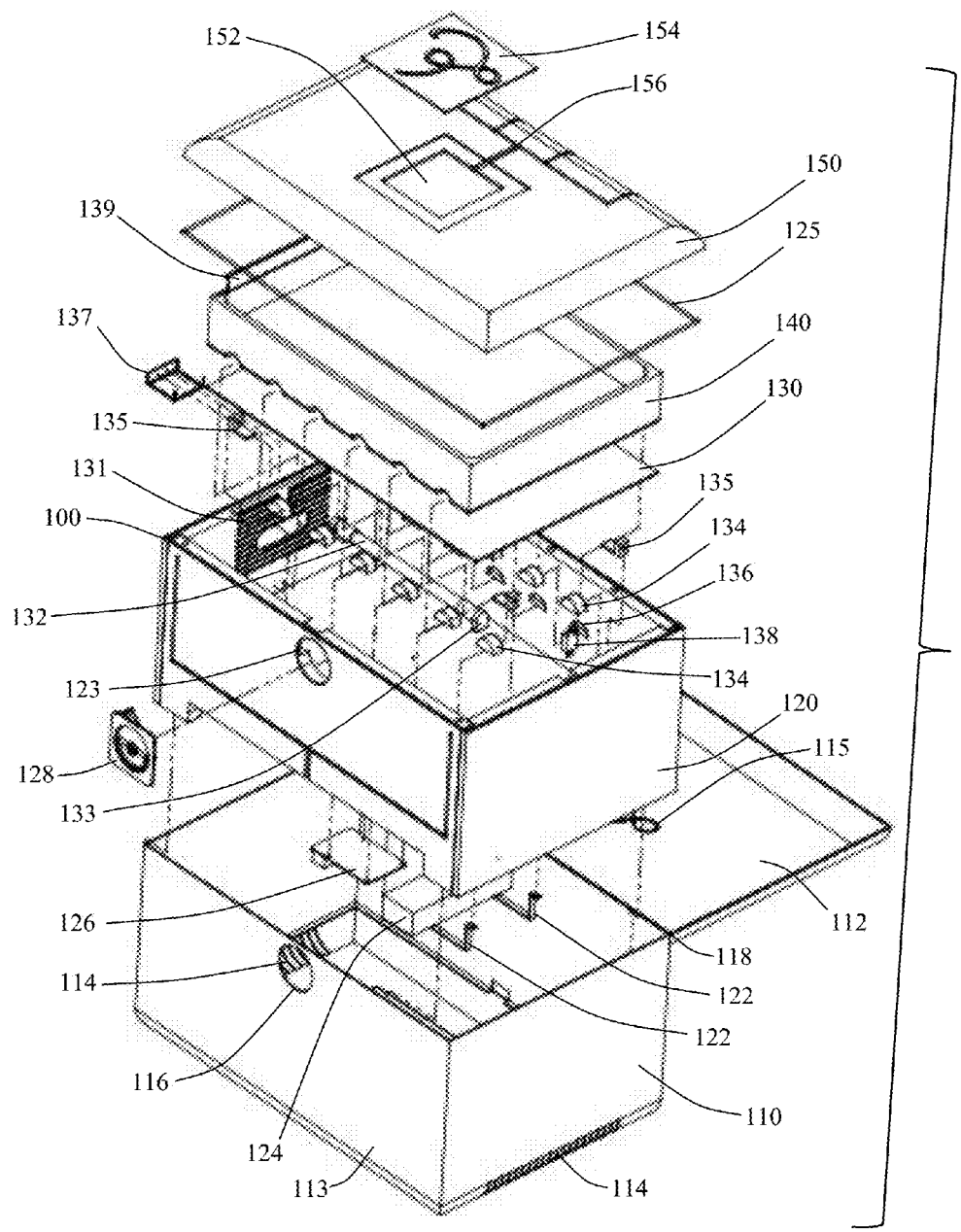
FIG. 8 is an exploded perspective view of an apparatus of FIG. 1.
Figure 9:
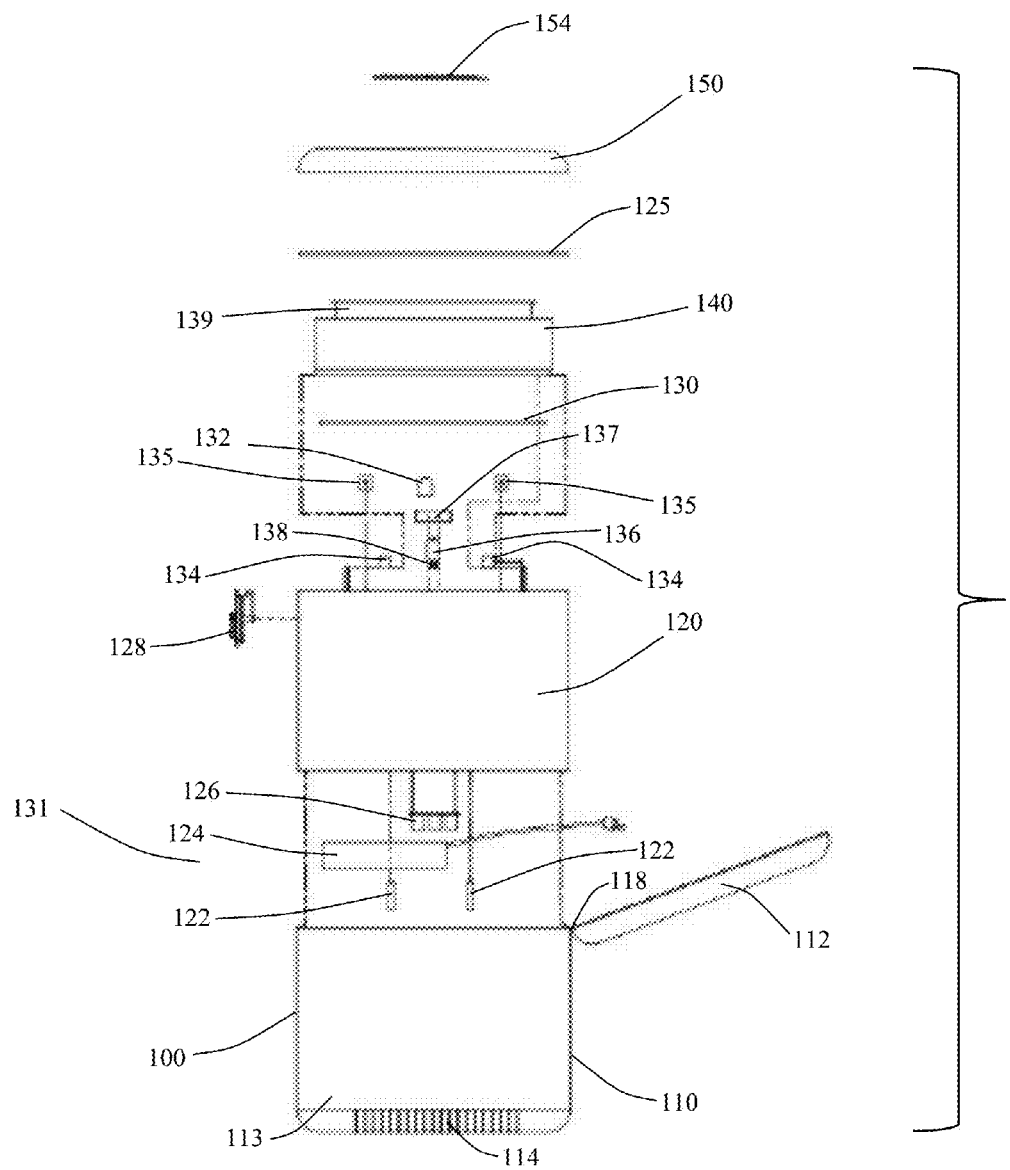
FIG. 9 is an exploded side view of an apparatus of FIG. 1.
Figure 10:
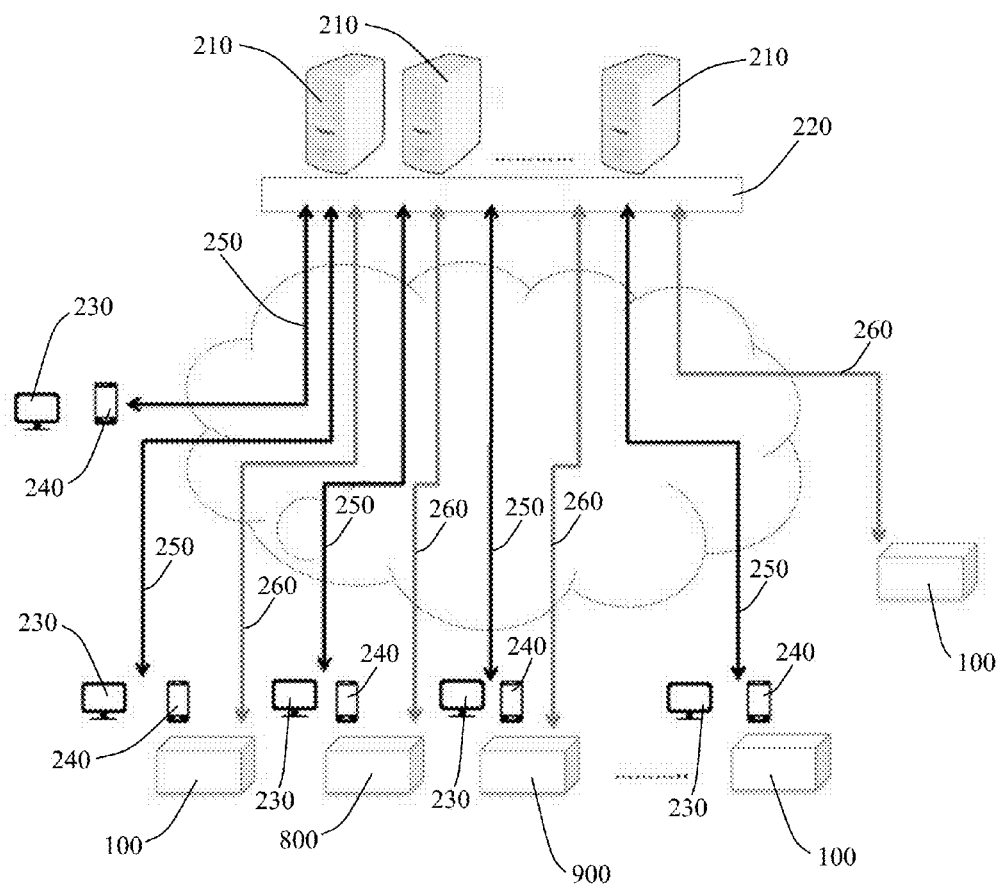
FIG. 10 is a diagram, which describes a preferred embodiment of a network configuration related to the present invention.
Figure 11:
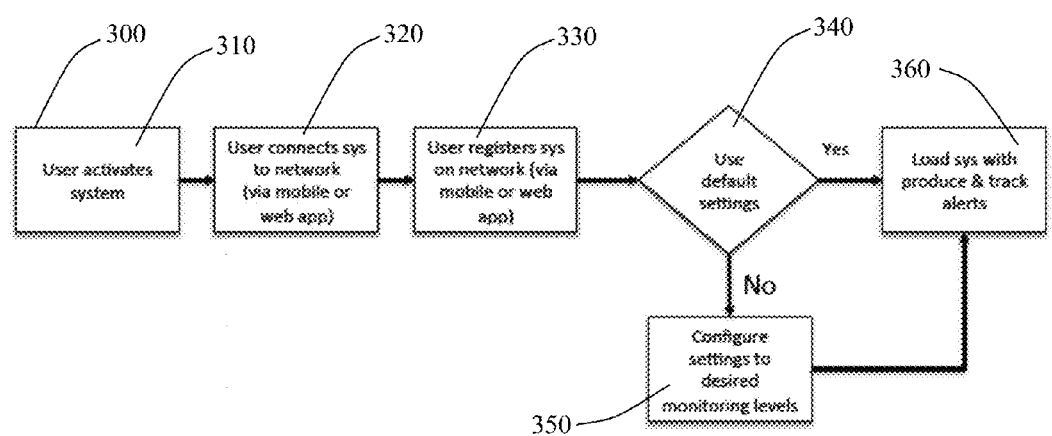
FIG. 11 is a flow chart, which describes the process for setting up and configuring the present invention.
Figure 12:
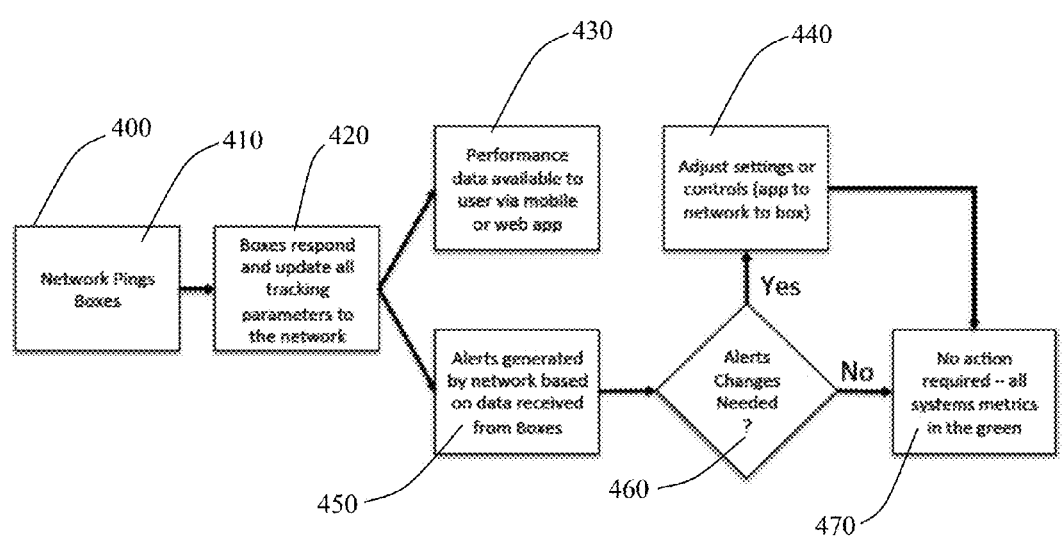
FIG. 12 is a flow chart, which describes the interactions of the software application, server network and the present invention.
Figure 13:
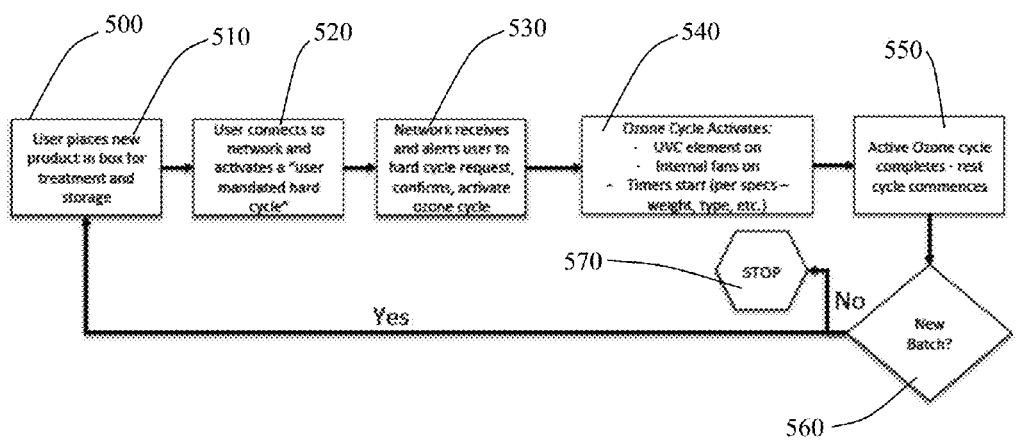
FIG. 13 is a flow chart, which describes the process for the manual operation of the present invention.
Figure 14:
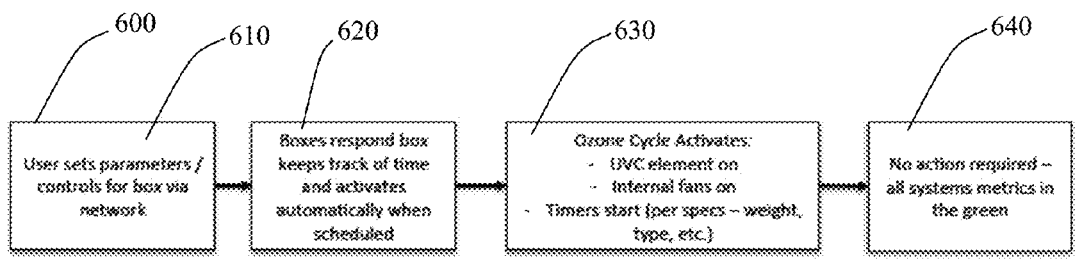
FIG. 14 is a flow chart, which describes the process for the programmed operation of the present invention.
Figure 15:
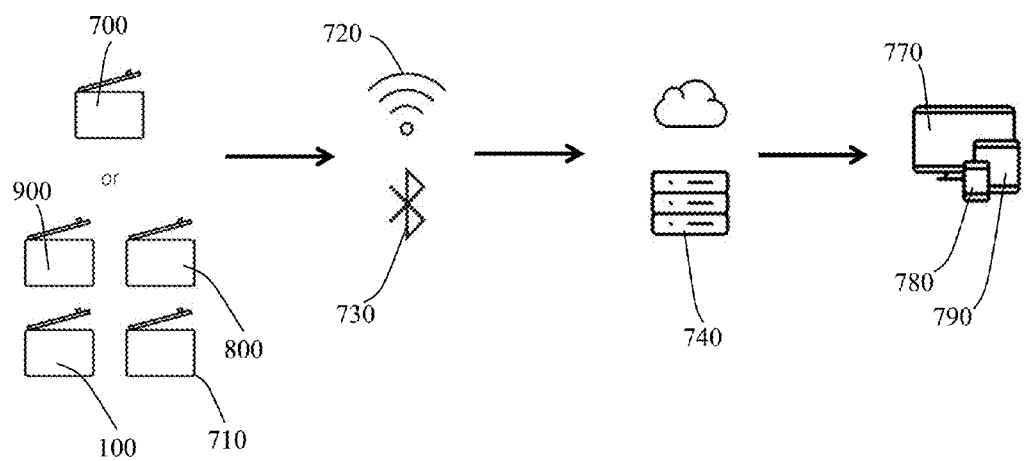
FIG. 15 is a diagram, which describes a most preferred embodiment of a network configuration related to the present invention.

Referring now to a preferred embodiment of the present invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and FIG. 15, a Neutral Atmosphere and Sanitization Storage Apparatus 100 is shown. FIG. 1 illustrates a perspective view of a Neutral Atmosphere and Sanitization Storage Apparatus 100. FIG. 2 depicts a perspective view of a Neutral Atmosphere and Sanitization Storage Apparatus 100 with an open inner lid 150 and outer lid 112, which are combined in the assembled Neutral Atmosphere and Sanitization Storage Apparatus 100. FIG. 3 shows a front view of a Neutral Atmosphere and Sanitization Storage Apparatus 100. FIG. 4 displays a side view of a Neutral Atmosphere and Sanitization Storage Apparatus 100. FIG. 5 shows a top view of a Neutral Atmosphere and Sanitization Storage Apparatus 100. FIG. 6 depicts a top view of a Neutral Atmosphere and Sanitization Storage Apparatus 100 with an open inner lid 150 and outer lid 112. FIG. 7 illustrates a rear cutaway view of a Neutral Atmosphere and Sanitization Storage Apparatus 100 with the cutaway positioned at the dotted line 160 in FIG. 5. FIG. 8 demonstrates an exploded perspective view of a Neutral Atmosphere and Sanitization Storage Apparatus 100. FIG. 9 shows an exploded side view of a Neutral Atmosphere and Sanitization Storage Apparatus 100. FIG. 10 displays a diagram, which describes the network configuration related to the Neutral Atmosphere and Sanitization Storage Apparatus 100. FIG. 11 depicts a flow chart, which describes the process for setting up and configuring the Neutral Atmosphere and Sanitization Storage Apparatus 100. FIG. 12 shows a flow chart, which describes the interactions of the web application 230, mobile application 240, network servers 210 and the Neutral Atmosphere and Sanitization Storage Apparatus 100. FIG. 13 illustrates a flow chart, which describes the process for the manual operation of the Neutral Atmosphere and Sanitization Storage Apparatus 100. FIG. 14 demonstrates a flow chart, which describes the process for the programmed operation of the Neutral Atmosphere and Sanitization Storage Apparatus 100. FIG. 15 shows a diagram, which describes a most preferred embodiment of a network configuration related to the present invention.

Referring still to a preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and FIG. 15, the Neutral Atmosphere and Sanitization Storage Apparatus 100 comprises an openable and lockable outer shell assembly 110 that encloses a processor module 126, a power supply module 124, and an inner box assembly 120 with a UV light source 132, a UV barrier 130, a combined humidity and temperature sensor 138, a fan 137, an inner tray 140 in which to store perishable items, and an integrated tray scraper 139. The outer shell assembly 110 comprises a shell body 113, an outer lid 112, and a cam lock assembly 128. The shell body 113 further comprises outer vents 114, which provide ventilation for the processor module 126 and the power supply module 124, and is connected to the outer lid 112 by a hinge 118. The outer lid 112 further comprises an LED indicator 115, which may appear in the form of a logo. The cam lock assembly 128 extends through an outer lock hole 116 and an inner lock hole 123 and is capable of locking the outer shell assembly 110 to prevent unauthorized access to the inner box assembly 120. The processor module 126 is wirelessly networked through a Wi-Fi connection 260 and capable of connecting to network servers 210 and communicating with web applications 230 and/or mobile applications 240 on mobile platforms, such as smart phones or tablets. Further, the processor module 126 is capable of receiving information from the combined humidity and temperature sensor 138, directing the locking or unlocking of the outer shell assembly 110, controlling the opening and closing of the inner box assembly 120, and coordinating the UV light source 132 and fan 137. The power supply module 124 is connected to the bottom of the inner box assembly 120 using power supply brackets 122. Because of the amount of power required to produce ozone and to facilitate the frequent operation of the present invention, the power supply module 124 operates on standard 120 VAC. The inner box assembly 120 is openable and airtight when closed and comprises an inner lid 150, a UV light source 132, a UV barrier 130, a combined humidity and temperature sensor 138, a humidity control unit 131, a fan 137, an inner tray 140 in which to store perishable items, and an integrated tray scraper 139. The inner lid 150 is integrated into the outer lid 112 of the outer shell assembly 110 when the present invention is assembled and further comprises an o-ring 125, an LED pocket 152, an LED pocket cover 154, and wire channels 156. The o-ring 125 seals the inner lid 150 to the inner box assembly 120 in an airtight manner. The LED pocket 152 is controlled by the processor module, and may be used to indicate whether the UV light source 132 is activated or other useful information about the present invention. The LED pocket cover 154 helps to scatter light from the LED pocket 152 and through the LED indicator 115. The UV light source 132 (UV-C class generating light element) is capable of converting ambient oxygen within the inner box assembly 120 into ozone (ozone saturation process) and is capable of being controlled by the processor module 126. The UV barrier 130 prevents any perishable items being stored on the inner tray 140 from being directly exposed to UV radiation while allowing the ambient oxygen within the airtight enclosure to be exposed to UV radiation so that the oxygen may be converted into ozone. The UV barrier is supported by a plurality of barrier brackets 135. A plurality of pegs 134 help create a space in which ambient air within the inner box assembly 120 may be circulated around the UV light source 132. The combined humidity and temperature sensor 138 is mounted on a sensor peg 136 and measures humidity and temperature levels within the inner box assembly 120 and relays the measured data to the processor module 126, so that the data may be used to trigger certain actions by the processor module 126, such as turning the UV light source 132 on or off, activating the humidity control unit 131, sending one or more alerts, or the like. The humidity control unit 131 is capable of adjusting the humidity within the airtight enclosure. The fan 137 circulates the ambient air within the inner box assembly 120 in order to maximize its exposure to UV radiation during the ozone saturation process. The inner tray 140 holds perishable items within the inner box assembly 120, so that the perishable items are protected from direct exposure to UV radiation during the ozone saturation process, and stores the perishable items in a region that is readily accessible when the inner lid 150 and outer lid 112 are open. The integrated tray scraper 139 allows for the inner tray 140 to be easily cleaned from any residue deposited by any perishable items being stored within the inner box assembly 120.

The construction details of the invention as shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14 and FIG. 15, are as follows. The outer shell assembly 110, including the shell body 113 and the outer lid 112, comprises a rigid durable material, such as aluminum, metal, steel, plastic, polycarbonate, composite material, ceramic, fiberglass, wood, or the like. The LED indicator 115 comprises a transparent or translucent material, such as plastic, polycarbonate, Plexiglas, glass, composite material, or the like. The inner box assembly 120, including the pegs 134, barrier brackets 135 and sensor pegs 136, comprises a rigid durable material, such as aluminum, metal, steel, plastic, polycarbonate, composite material, ceramic, fiberglass, wood, or the like. The power supply brackets 122 comprise a durable material, such as aluminum, metal, steel, plastic, composite material, or the like. The power supply 124 comprises a transformer, a 120 VAC power source, a battery pack, a solar cell, or the like. The O-ring 125 comprises rubber, silicone, plastic, or the like. The processor module 126 comprises a compact wirelessly connected computer. The cam lock assembly 128 interacts with the processor module 126 and comprises a rigid, durable material such as aluminum, metal, steel, composite material, or the like. The UV barrier 130 comprises a material that is opaque to UV radiation. The humidity control unit 131 comprises a compact unit that can adjust the ambient humidity within the airtight inner box 120. The UV light source 132 comprises an incandescent light bulb that radiates UV light or a UV LED or an array of UV LEDs, as well as, the electrical connections for the bulb or emitter(s). The fan 137 is a compact electrical component, which interacts with the processor module 126, and comprises a durable material, such as aluminum, metal, steel, plastic, composite material, or the like. The humidity and temperature sensor 138 is a compact electrical component, which interacts with the processor module 126, and comprises a durable material, such as aluminum, metal, steel, plastic, composite material, or the like. The integrated tray scraper 139 comprises a hard, durable material, such as aluminum, metal, steel, plastic, composite material, or the like. The inner tray 140 comprises a rigid material, such as aluminum, metal, steel, plastic, composite material, wood, or the like. The inner lid 150 comprises a rigid durable material, such as aluminum, metal, steel, plastic, polycarbonate, composite material, ceramic, fiberglass, wood, or the like. The inner lid LED pocket 152 comprises one or more LEDs and the associated electrical components and wrapping material, such as plastic, polycarbonate, Plexiglas, glass, composite material, or the like. The inner lid LED pocket cover 154 comprises a transparent or translucent material, such as plastic, polycarbonate, Plexiglas, glass, composite material, or the like. The wire channel 156 comprises a conductive material, such as copper, metal, or the like. The materials listed herein are examples only and not intended to limit the scope of the present invention.

Figure 16:
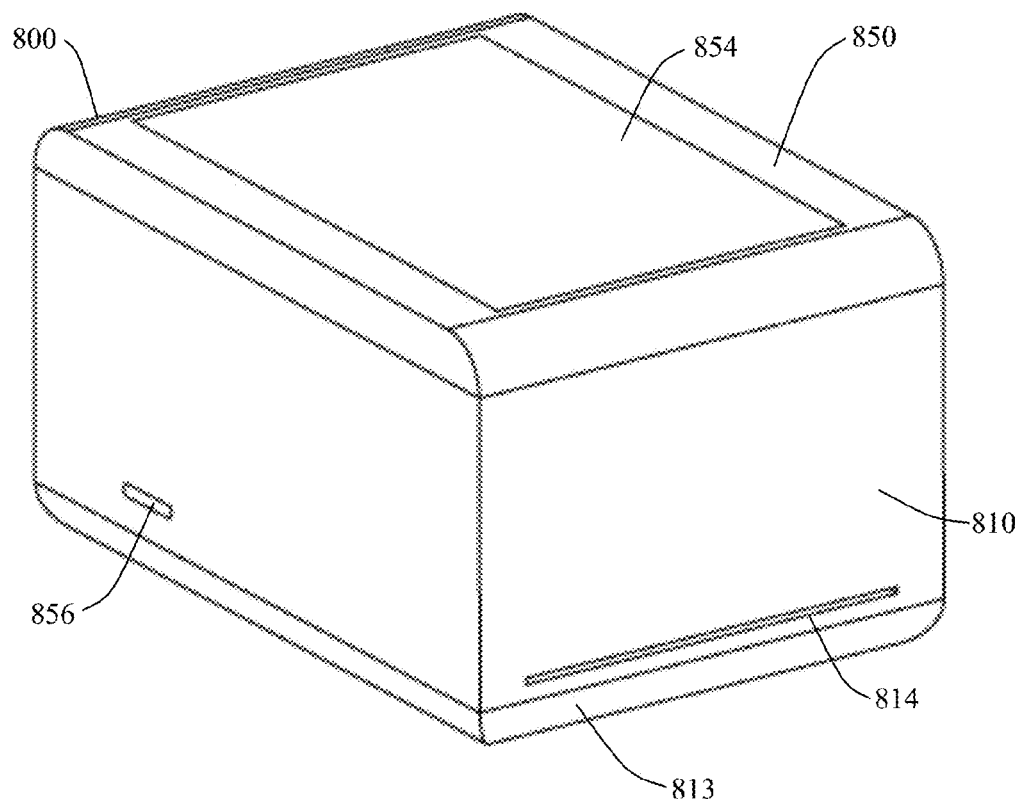
FIG. 16 is a perspective view of a more preferred embodiment of an apparatus of the present invention.
Figure 17:
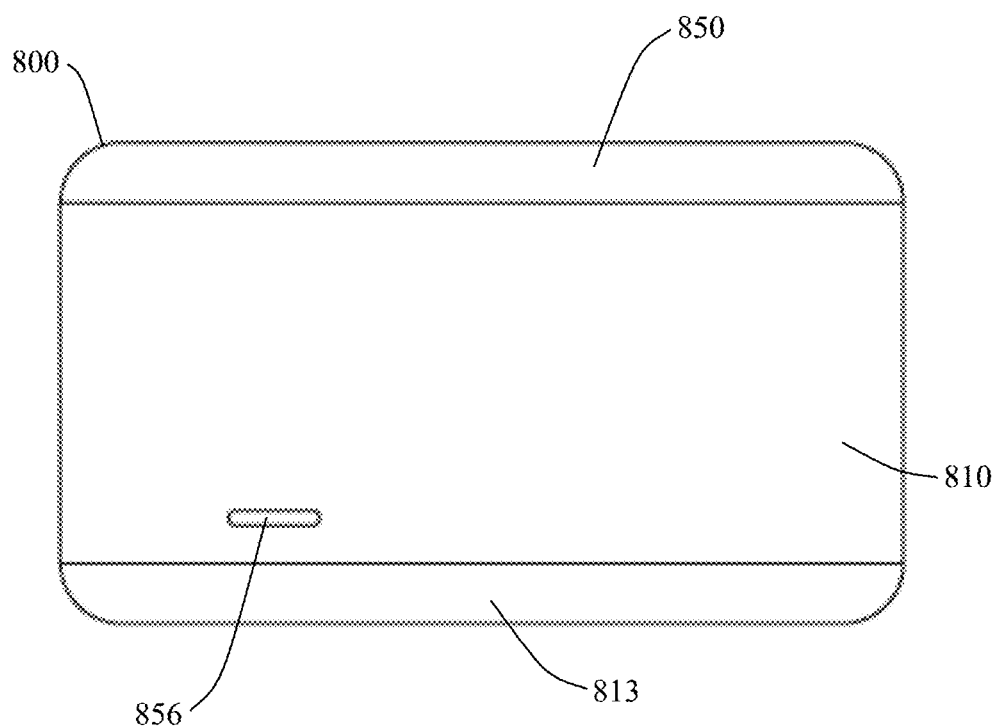
FIG. 17 is a front view of an apparatus of FIG. 16.
Figure 18:
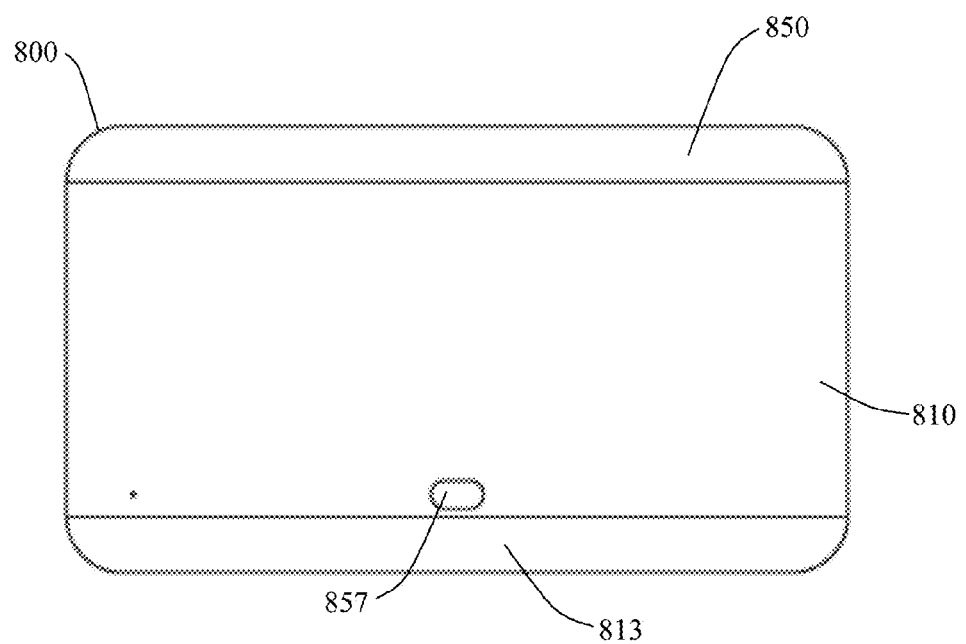
FIG. 18 is a rear view of an apparatus of FIG. 16.
Figure 19:
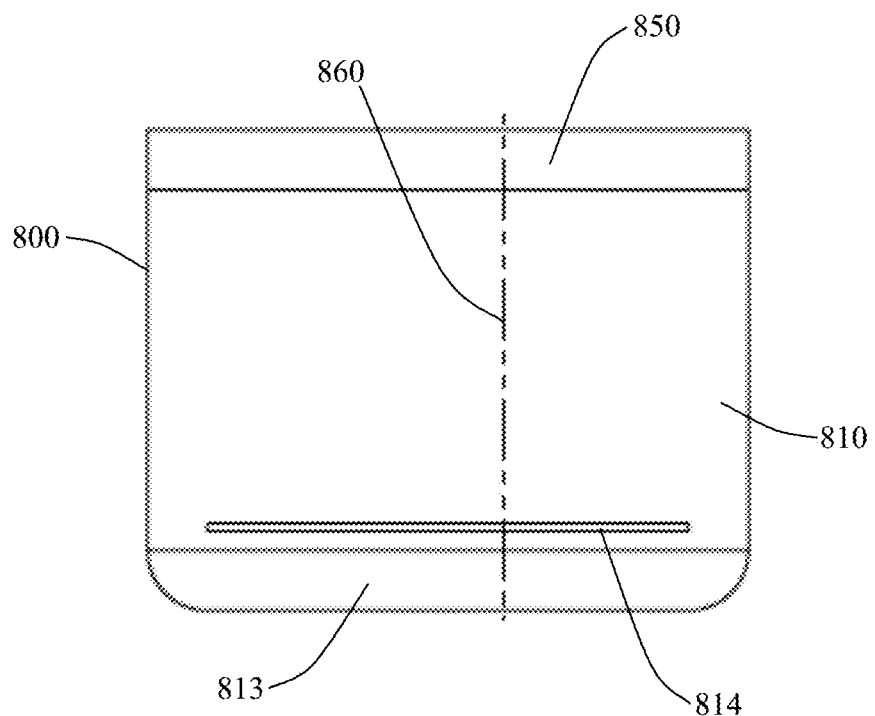
FIG. 19 is a side view of an apparatus of FIG. 16.
Figure 20:
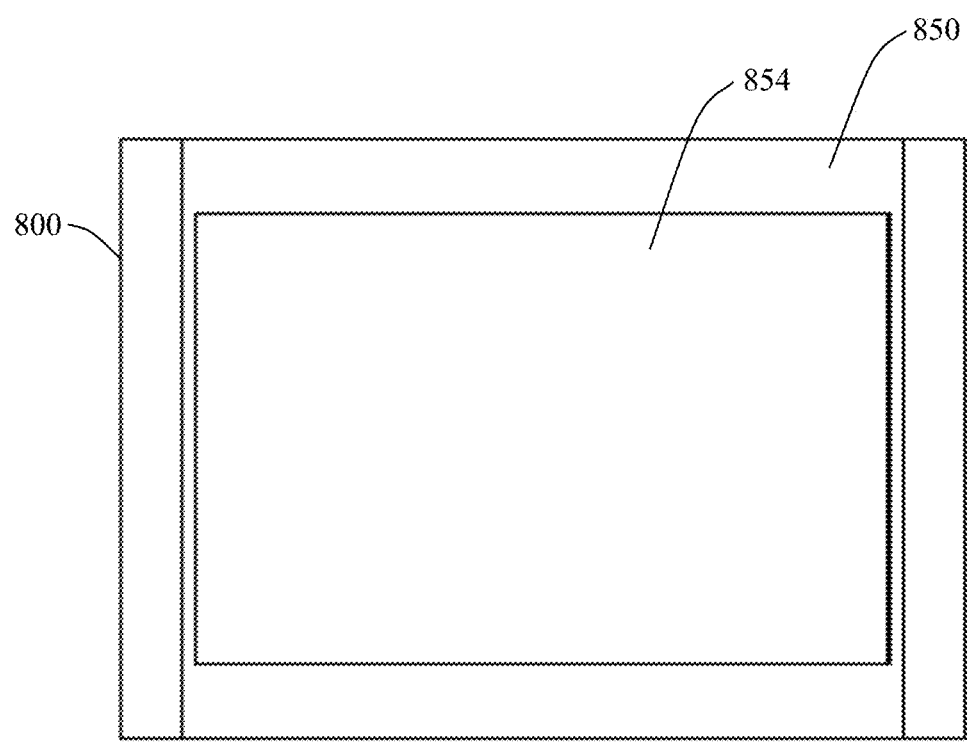
FIG. 20 is a top view of an apparatus of FIG. 16.
Figure 21:
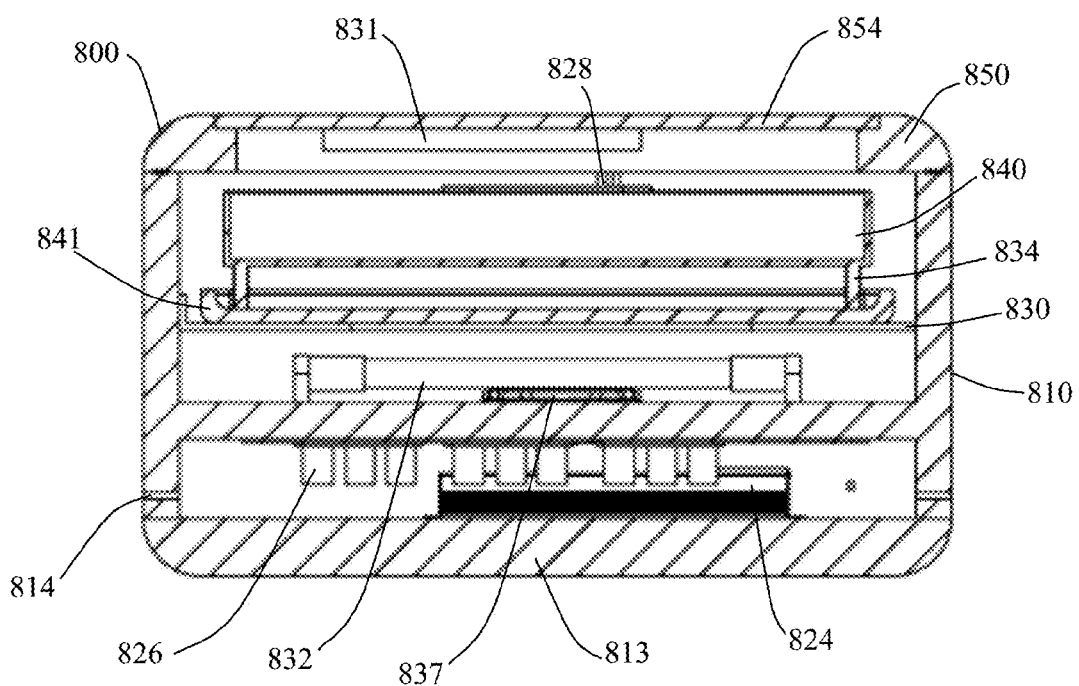
FIG. 21 is a rear cutaway view of an apparatus of FIG. 19, showing the interior of the present invention.
Figure 22:
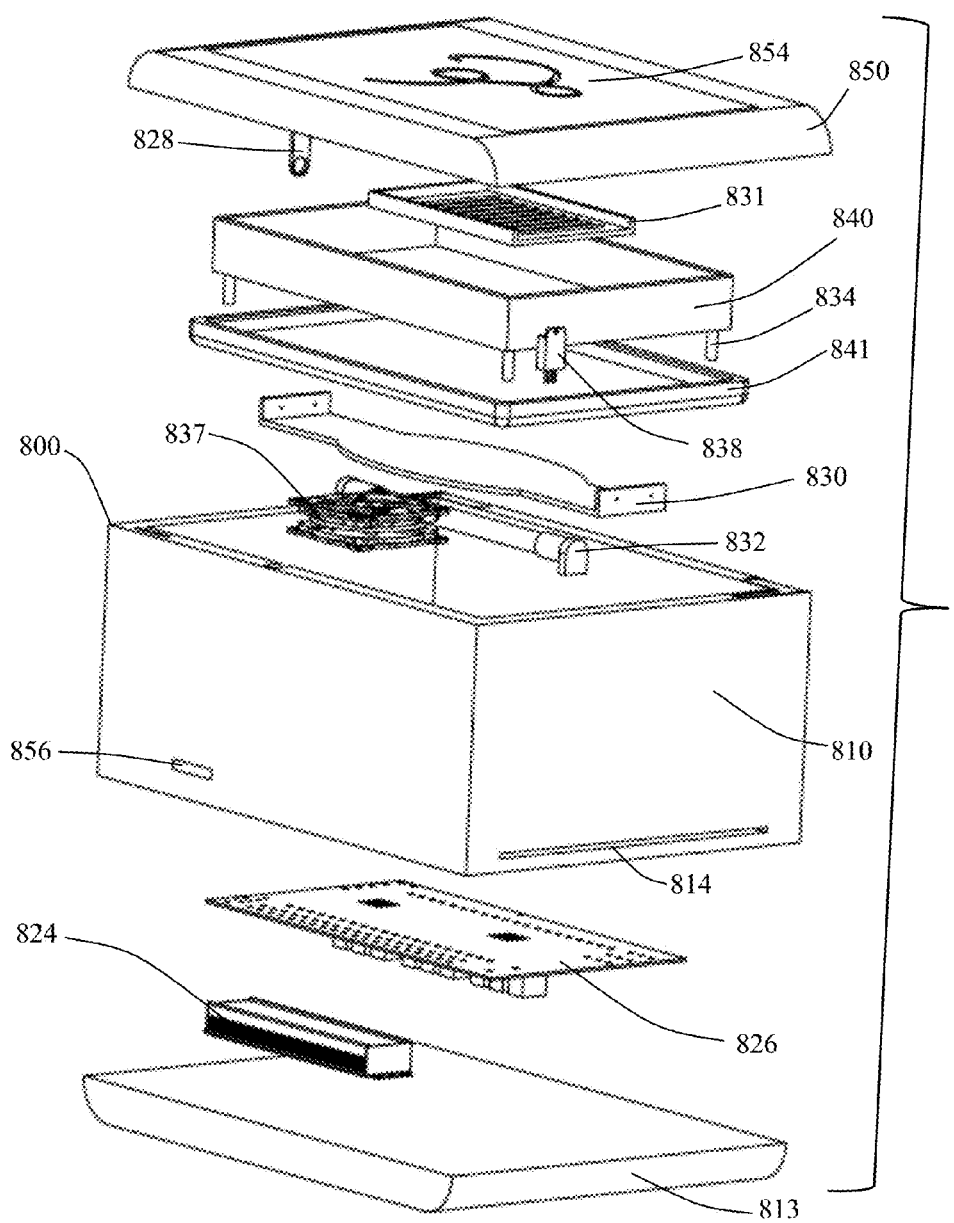
FIG. 22 is an exploded perspective view of an apparatus of FIG. 16.

Referring now to a more preferred embodiment of the invention, in FIG. 10, FIG. 11, FIG. 12, FIG. 13, FIG. 14, FIG. 15, FIG. 16, FIG. 17, FIG. 18, FIG. 19, FIG. 20, FIG. 21, and FIG. 22, a Classic Neutral Atmosphere and Sanitization Storage Apparatus 800 is shown. FIG. 10 displays a diagram, which describes the network configuration related to the Classic Neutral Atmosphere and Sanitization Storage Apparatus 800. FIG. 11 depicts a flow chart, which describes the process for setting up and configuring the Classic Neutral Atmosphere and Sanitization Storage Apparatus 800. FIG. 12 shows a flow chart, which describes the interactions of the web application 230, mobile application 240, network servers 210 and the Classic Neutral Atmosphere and Sanitization Storage Apparatus 800. FIG. 13 illustrates a flow chart, which describes the process for the manual operation of the Classic Neutral Atmosphere and Sanitization Storage Apparatus 800. FIG. 14 demonstrates a flow chart, which describes the process for the programmed operation of the Classic Neutral Atmosphere and Sanitization Storage Apparatus 800. FIG. 15 shows a diagram, which describes a most preferred embodiment of a network configuration related to the Classic Neutral Atmosphere and Sanitization Storage Apparatus 800. FIG. 16 illustrates a perspective view of a Classic Neutral Atmosphere and Sanitization Storage Apparatus 800. FIG. 17 shows a front view of a Classic Neutral Atmosphere and Sanitization Storage Apparatus 800. FIG. 18 depicts a rear view of a Classic Neutral Atmosphere and Sanitization Storage Apparatus 800. FIG. 19 displays a side view of a Classic Neutral Atmosphere and Sanitization Storage Apparatus 800. FIG. 20 shows a top view of a Classic Neutral Atmosphere and Sanitization Storage Apparatus 800. FIG. 21 illustrates a rear cutaway view of a Classic Neutral Atmosphere and Sanitization Storage Apparatus 800 with the cutaway positioned at the dotted line 860 in FIG. 19. FIG. 22 demonstrates an exploded perspective view of a Classic Neutral Atmosphere and Sanitization Storage Apparatus 800.

Referring still to a more preferred embodiment of the invention, in FIG. 10, FIG. 11, FIG. 12, FIG. 13, FIG. 14, FIG. 15, FIG. 16, FIG. 17, FIG. 18, FIG. 19, FIG. 20, FIG. 21, and FIG. 22, the Classic Neutral Atmosphere and Sanitization Storage Apparatus 800 comprises an openable and lockable Classic shell assembly 810 that encloses a Classic processor module 826, a Classic power supply/ballast module 824, a Classic UV light source 832, a Classic UV barrier 830, a shallow tray 841, a combined Classic humidity and temperature sensor 838, a Classic fan 837, and a perforated basket 840 in which to store perishable items or biomass, which is suspended above the shallow tray 841 using depending Classic pegs 834 that depend from the perforated basket 840. The Classic shell assembly 810 comprises a bottom box 813, a Classic outer lid 850, a Classic inner lid 854 that is mounted on the Classic outer lid 850, a humidity pack holder 831 that is mounted to Classic inner lid 854, a Classic solenoid lock 828, a Classic LED indicator 856 and Classic outer vents 814, which provide ventilation for the Classic processor module 826 and the Classic power supply/ballast module 824. The Classic solenoid lock 828 is capable of locking the Classic shell assembly 810 and Classic outer lid 850 to prevent unauthorized access to the interior of the apparatus and may be controlled by the Classic processor module 826. The Classic processor module 826 is wirelessly networked through a direct Wi-Fi connection 720 or a direct Bluetooth connection 730 and capable of connecting to direct network servers 740 and, through the direct network servers 740, communicating with applications running on personal computers 770, smart phones 780 or tablets 790. Further, the Classic processor module 826 is capable of receiving information from the combined humidity and temperature sensor 838, directing the locking or unlocking of the Classic shell assembly 810 by controlling the Classic solenoid lock 828, controlling the Classic LED indicator, and coordinating the Classic UV light source 832 and Classic fan 837. Because of the amount of power required to produce ozone and to facilitate the frequent operation of the present invention, the Classic power supply/ballast module 824 operates on standard 120 VAC. The Classic shell assembly 810 is openable and airtight when closed. The Classic LED indicator 856 is controlled by the Classic processor module 826, and may be used to indicate whether the Classic UV light source 832 is activated or other useful information about the present invention. The Classic UV light source 832 (UV-C class generating light element) is capable of converting ambient oxygen within the Classic shell assembly 810 into ozone (ozone saturation process) and is capable of being controlled by the Classic processor module 826. The Classic UV barrier 830 prevents any perishable items or biomass being stored on the perforated basket 840 from being directly exposed to UV radiation while allowing the ambient oxygen within the airtight enclosure to be exposed to UV radiation so that the oxygen may be converted into ozone. The perforated basket 840 is sufficiently perforated to allow the free flow of air around any perishable item or biomass being stored within the Classic Neutral Atmosphere and Sanitization Storage Apparatus 800. A plurality of Classic pegs 834, which depend from the perforated basket 840 help create a space in which ambient air within the Classic shell assembly 810 may be circulated around the Classic UV light source 832. The combined Classic humidity and temperature sensor 838 is mounted in close proximity to the perforated basket 840 and measures humidity and temperature levels within the Classic shell assembly 810 and relays the measured data to the Classic processor module 826, so that the data may be used to trigger certain actions by the Classic processor module 826, such as turning the Classic UV light source 832 on or off, suggesting humidity packs for the humidity pack holder 831, sending one or more alerts, or the like. The humidity pack holder 831 is perforated and is capable of adjusting the humidity within the airtight enclosure by suspending humidity packs within the Classic shell assembly 810. The Classic fan 837 circulates the ambient air within the Classic shell assembly 810 in order to maximize its exposure to UV radiation during the ozone saturation process. The perforated basket 840 holds perishable items or biomass within the Classic shell assembly 810, so that the perishable items or biomass are protected from direct exposure to UV radiation during the ozone saturation process, sufficiently exposed to the air within the Classic shell assembly 810 to benefit from ozone saturation, temperature control, and humidity control, and stores the perishable items or biomass in a region that is readily accessible when the Classic outer lid 850 is open.

The construction details of the invention as shown in FIG. 10, FIG. 11, FIG. 12, FIG. 13, FIG. 14, FIG. 15, FIG. 16, FIG. 17, FIG. 18, FIG. 19, FIG. 20, FIG. 21, and FIG. 22, are as follows. The Classic shell assembly 810, including the bottom box 813, the Classic outer lid 850, and the Classic inner lid 854, comprises a rigid durable material, such as aluminum, metal, steel, glass, plastic, polycarbonate, composite material, ceramic, fiberglass, wood, or the like. The Classic LED indicator 856 comprises a transparent or translucent material, such as plastic, polycarbonate, Plexiglas, glass, composite material, or the like. The Classic power supply/ballast 824 comprises a transformer, a 120 VAC power source, a ballast, a battery pack, a solar cell, or the like. The Classic processor module 826 comprises a compact wirelessly connected computer. The Classic solenoid lock 828 interacts with the Classic processor module 826 and comprises a rigid, durable material such as aluminum, metal, steel, composite material, or the like. The Classic UV barrier 830 comprises a material that is opaque to UV radiation, such as wood, metal, or the like. The humidity pack holder 831 comprises a compact unit that can adjust the ambient humidity within the Classic shell assembly 810, and may comprise a compartment comprising a perforated material, such as wood, metal, plastic, or the like. The Classic UV light source 832 comprises an incandescent light bulb that radiates UV light or a UV LED or an array of UV LEDs, as well as, the electrical connections for the bulb or emitter(s). The Classic fan 837 is a compact electrical component, which interacts with the Classic processor module 826 and Classic power supply/ballast module 824, and comprises a durable material, such as aluminum, metal, steel, plastic, composite material, or the like. The combined Classic humidity and temperature sensor 838 is a compact electrical component, which interacts with the Classic processor module 826, and comprises a durable material, such as aluminum, metal, steel, plastic, composite material, or the like. The perforated basket 840 comprises a rigid perforated material, which allows free air flow through the perforated basket 840, such as aluminum, metal, steel, plastic, composite material, wood, or the like. The shallow tray 841 comprises a rigid durable material, such as aluminum, metal, steel, glass, plastic, polycarbonate, composite material, ceramic, fiberglass, wood, or the like. The Classic pegs 834 comprise a rigid durable material, such as aluminum, metal, steel, glass, plastic, polycarbonate, composite material, ceramic, fiberglass, wood, or the like. The materials listed herein are examples only and not intended to limit the scope of the present invention.

Figure 23:
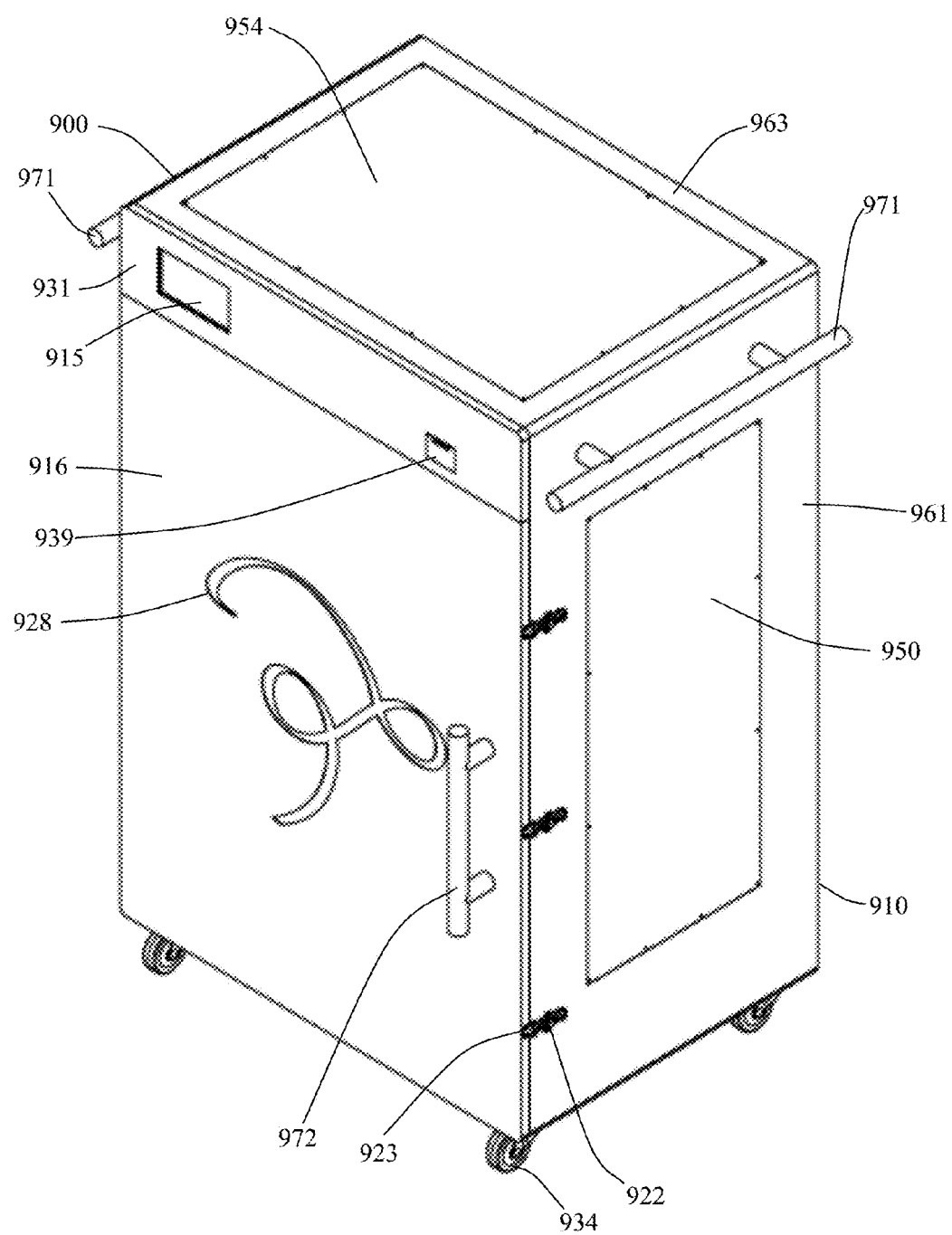
FIG. 23 is a perspective view of a most preferred embodiment of an apparatus of the present invention.
Figure 24:
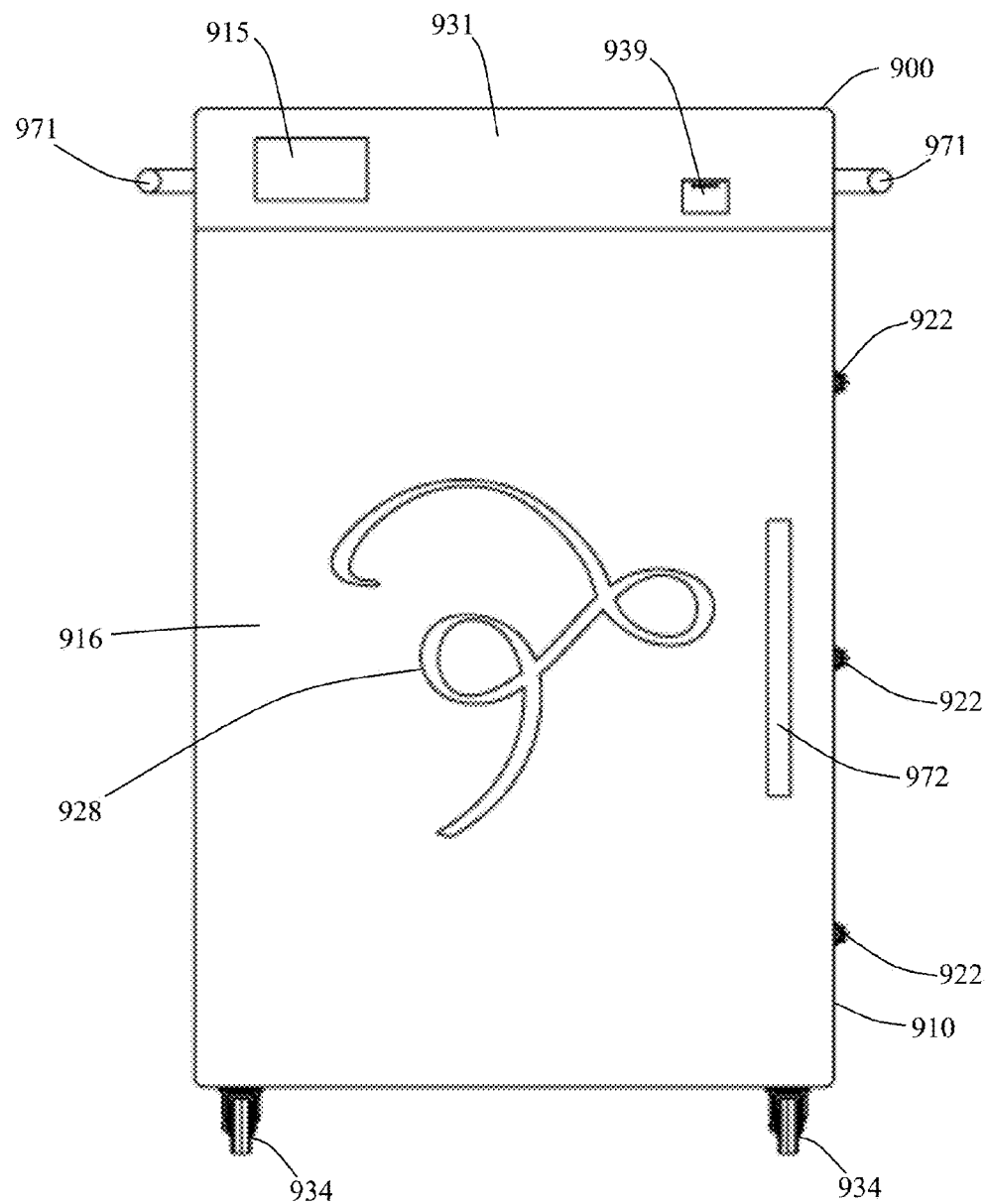
FIG. 24 is a front view of an apparatus of FIG. 23.
Figure 25:
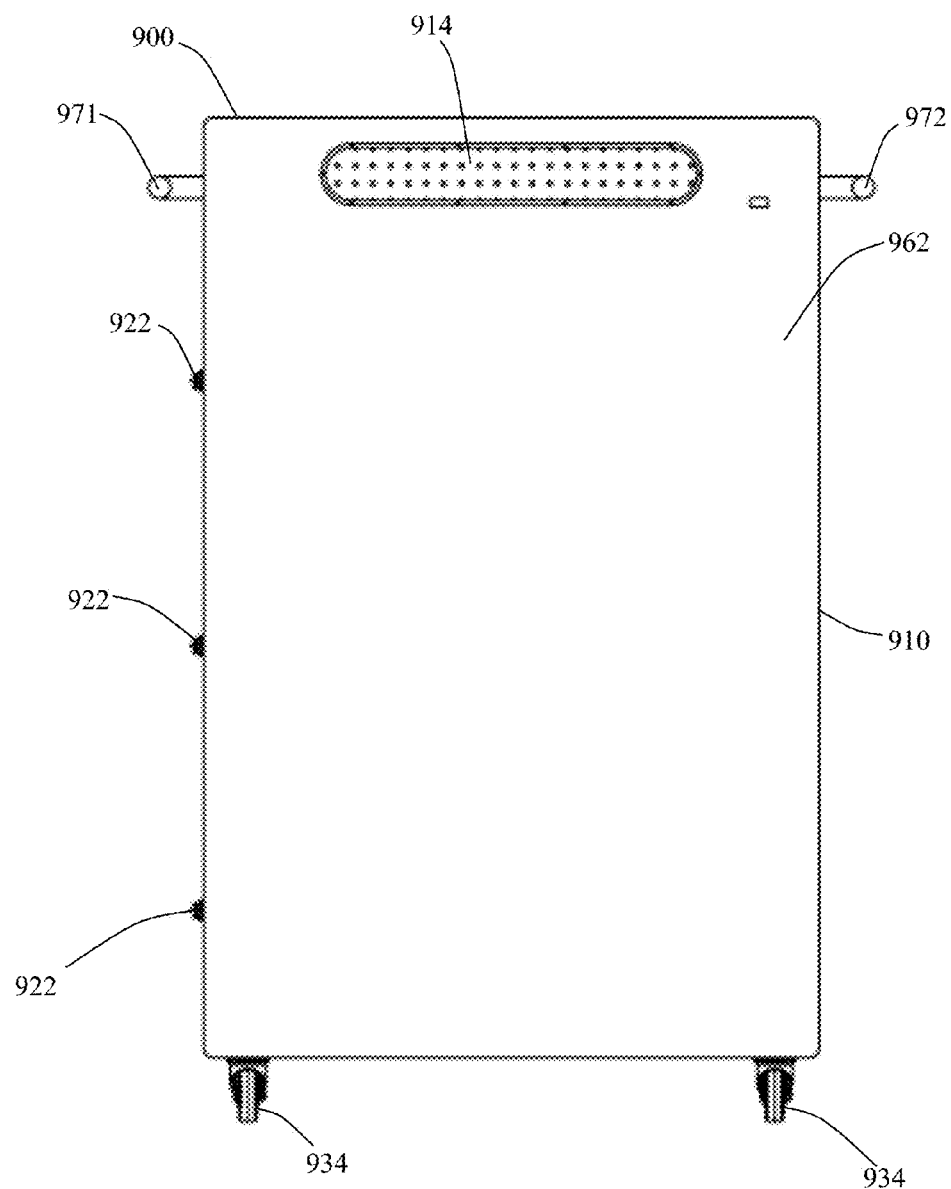
FIG. 25 rear view of an apparatus of FIG. 23.
Figure 26:
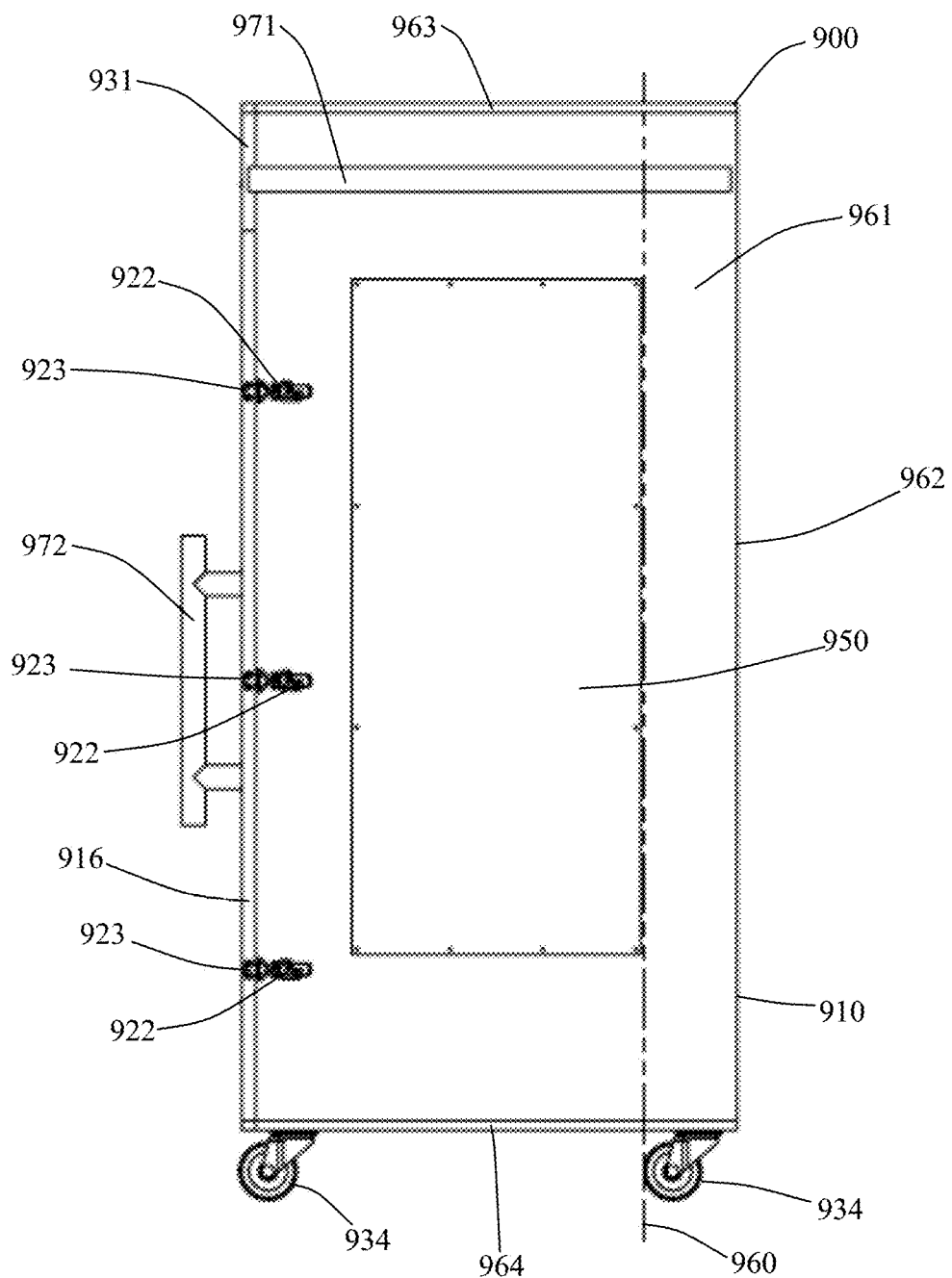
FIG. 26 is a side view of an apparatus of FIG. 23.
Figure 27:
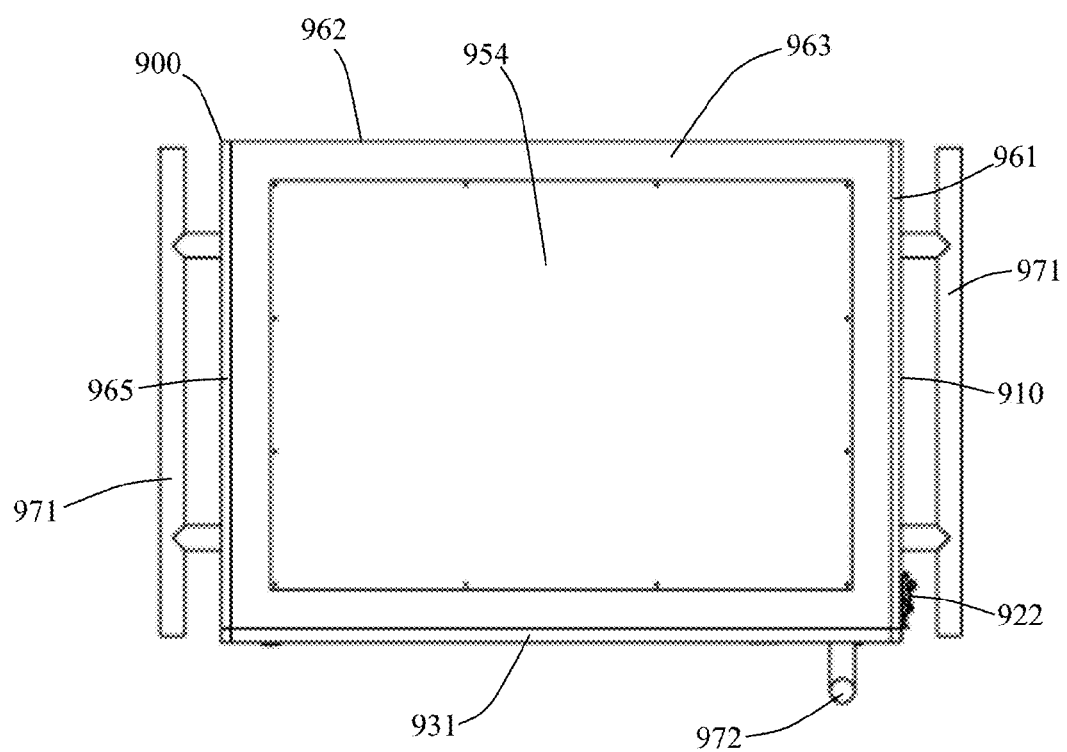
FIG. 27 is a top view of an apparatus of FIG. 23.
Figure 28:
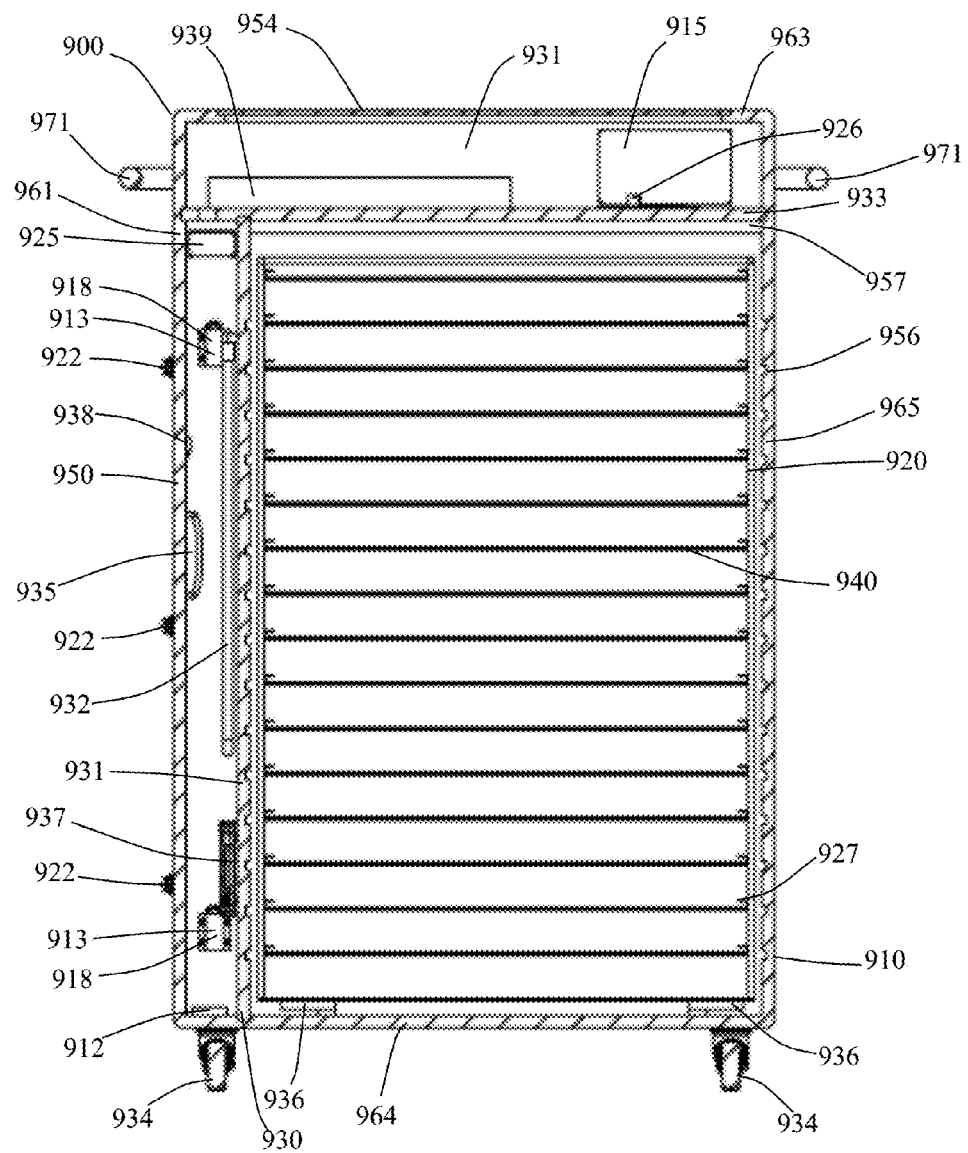
FIG. 28 is a rear cutaway view of an apparatus of FIG. 26, showing the interior of the present invention.
Figure 29:
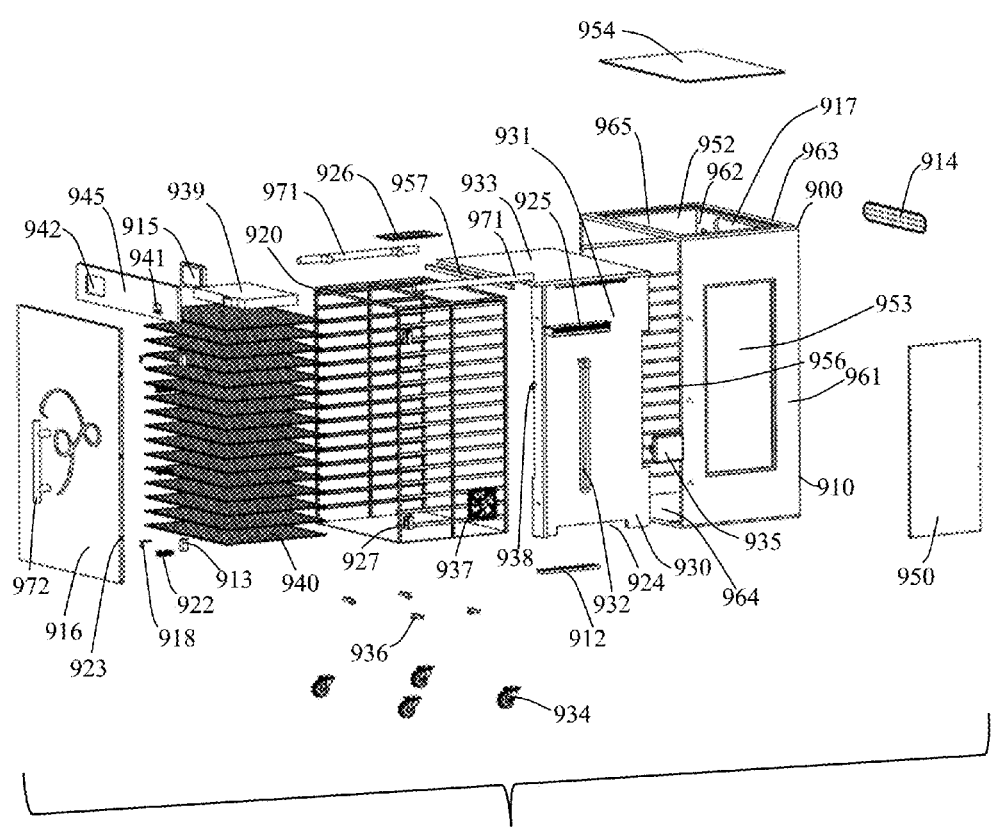
FIG. 29 is an exploded perspective view of an apparatus of FIG. 23.

Referring now to the most preferred embodiment of the invention, in FIG. 10, FIG. 11, FIG. 12, FIG. 13, FIG. 14, FIG. 15, FIG. 23, FIG. 24, FIG. 25, FIG. 26, FIG. 27, FIG. 28, and FIG. 29, a Pro Neutral Atmosphere and Sanitization Storage Apparatus 900 is shown. FIG. 10 displays a diagram, which describes the network configuration related to the Pro Neutral Atmosphere and Sanitization Storage Apparatus 900. FIG. 11 depicts a flow chart, which describes the process for setting up and configuring the Pro Neutral Atmosphere and Sanitization Storage Apparatus 900. FIG. 12 shows a flow chart, which describes the interactions of the web application 230, mobile application 240, network servers 210 and the Pro Neutral Atmosphere and Sanitization Storage Apparatus 900. FIG. 13 illustrates a flow chart, which describes the process for the manual operation of the Pro Neutral Atmosphere and Sanitization Storage Apparatus 900. FIG. 14 demonstrates a flow chart, which describes the process for the programmed operation of the Pro Neutral Atmosphere and Sanitization Storage Apparatus 900. FIG. 15 shows a diagram, which describes a most preferred embodiment of a network configuration related to the Pro Neutral Atmosphere and Sanitization Storage Apparatus 900. FIG. 23 illustrates a perspective view of a Pro Neutral Atmosphere and Sanitization Storage Apparatus 900. FIG. 24 shows a front view of a Pro Neutral Atmosphere and Sanitization Storage Apparatus 900. FIG. 25 depicts a rear view of a Pro Neutral Atmosphere and Sanitization Storage Apparatus 900. FIG. 26 displays a side view of a Pro Neutral Atmosphere and Sanitization Storage Apparatus 900. FIG. 27 shows a top view of a Pro Neutral Atmosphere and Sanitization Storage Apparatus 900. FIG. 28 illustrates a rear cutaway view of a Pro Neutral Atmosphere and Sanitization Storage Apparatus 900 with the cutaway positioned at the dotted line 960 in FIG. 26. FIG. 29 demonstrates an exploded perspective view of a Pro Neutral Atmosphere and Sanitization Storage Apparatus 900.

Referring still to the most preferred embodiment of the invention, in FIG. 10, FIG. 11, FIG. 12, FIG. 13, FIG. 14, FIG. 15, FIG. 23, FIG. 24, FIG. 25, FIG. 26, FIG. 27, FIG. 28, and FIG. 29, the Pro Neutral Atmosphere and Sanitization Storage Apparatus 900 comprises an openable and lockable Pro outer shell assembly 910, an airtight Pro inner shell assembly 930, and a Pro exposure chamber cage 920. The Pro outer shell assembly 910 comprises a Pro front door 916, a Pro left side panel 965, a Pro right side panel 961, a Pro rear panel 962, a Pro top panel 963, a Pro bottom panel 964, and a Pro electronics cover 945. The Pro front door 916 comprises a Pro front handle 972 and a plurality of Pro latch receivers 923 and is hingedly attached to the Pro left side panel 965. The Pro left side panel 965 is hingedly attached to the Pro front door 916 and comprises a Pro side handle 971 and a plurality of Pro wall cutouts 956 that run down the interior of the Pro left side panel 965 for optionally receiving Pro perforated trays 940. The Pro right side panel 961 comprises a Pro side door opening 953, a Pro side door 950 that fits into the Pro side door opening 953, a Pro side handle 971, a plurality of Pro locking latches 922 that lockably connect to the plurality of Pro latch receivers 923 in the Pro front door 916, and plurality of Pro solenoid locks 918 and Pro solenoid assemblies 913 that interact with the Pro processor module 926, the Pro latch receivers 923, and the Pro locking latches 922 to control the locking and unlocking of the Pro outer shell assembly 910 to prevent unauthorized access to the Pro Neutral Atmosphere and Sanitization Storage Apparatus 900. The Pro rear panel 962 comprises a Pro outer vent opening 917 and Pro outer vent 914, which fits into the Pro outer vent opening 917 and provides ventilation for the enclosed electronics. The Pro top panel 963 comprises a Pro top opening 952 and a Pro top access panel 954, which fits into the Pro top opening 952 and provides access to the enclosed electronics. The Pro bottom panel 964 comprises a set of Pro casters 934 that depend from the bottom of the Pro bottom panel 964 and allow the Pro Neutral Atmosphere and Sanitization Storage Apparatus 900 to be transported. The Pro electronics cover 945 is above the Pro Front door 916 and comprises a Pro UPS access opening 941, through which the Pro power supply/UPS module 939 extends, and a Pro touchscreen opening 942, through which the Pro touchscreen 915 extends, so that both components may be controlled. The Pro inner shell assembly 930 comprises a Pro electronics shelf 933; which provides an airtight barrier enclosing the Pro exposure chamber cage 920, the Pro UV light source 932, the Pro ballast 925, the combined Pro humidity and temperature sensor 938, the Pro inner vent 924, the Pro heating element 912, and the Pro humidifier 935; and a Pro UV barrier 931, which prevents any perishable items or biomass being stored within the apparatus on the Pro perforated trays 940 from being directly exposed to UV radiation while allowing the ambient oxygen within the airtight enclosure to be exposed to UV radiation so that the oxygen may be converted into ozone. The Pro electronics shelf 933 comprises the electronics and provides supports for them. The electronics comprise a Pro touchscreen 915, a Pro processor module 926, and a Pro power supply/UPS module 939. The Pro UV barrier 931 also comprises the exposure equipment, and provides support for them. The exposure equipment comprise a Pro UV light source 932 that is attached to the Pro UV barrier 931, a Pro ballast 925 that is attached to the Pro UV barrier 931, a Pro ballast 925 that is attached to the Pro UV barrier, a combined Pro humidity and temperature sensor 938, a Pro heating element 912, a Pro humidifier 935, and a Pro inner vent 924, which is a space in the Pro UV barrier 931 that allows air to circulate around the Pro UV light source 932, the combined Pro humidity and temperature sensor 938, the Pro heating element 912, the Pro humidifier 935 and the Pro exposure chamber cage 920. The Pro exposure chamber cage 920 is airtightably enclosed within the Pro inner shell assembly 930 and comprises a cage comprised of a plurality of Pro u-brackets 927 that support a plurality of slidable Pro perforated trays 940, a set of load weight sensors 936, and a Pro fan 937, which is attached to the cage. The Pro processor module 926 is wirelessly networked through a direct Wi-Fi connection 720 or a direct Bluetooth connection 730 and capable of connecting to direct network servers 740 and, through the direct network servers 740, communicating with applications running on personal computers 770, smart phones 780 or tablets 790. Further, the Pro processor module 926 is capable of receiving information from the combined Pro humidity and temperature sensor 938 and the load weigh sensors 936; directing the locking or unlocking of the Pro front door 916 by controlling the Pro locking latch 922, Pro solenoid lock 918, Pro solenoid assembly 913 and the Pro latch receiver 923; controlling the Pro touchscreen 915; and coordinating and dynamically controlling the Pro UV light source 932, the Pro heating element 912, the Pro humidifier 935 and the Pro fan 937. Because of the amount of power required to produce ozone and to facilitate the frequent operation of the present invention, the Pro power supply/UPS module 939 operates on standard 120 VAC and is also capable of providing uninterrupted power supply in case of a power outage. The Pro inner shell assembly 930 is openable using the Pro front door 916 and airtight when the Pro front door 916 is closed. The Pro touchscreen 915 is controlled by the Pro processor module 926, and may be used to indicate whether the Pro UV light source 932 is activated or other useful information about the present invention, such as temperature and humidity readings or the contents of the Pro perforated trays 940 and their weight. The Pro UV light source 932 (UV-C class generating light element) is capable of converting ambient oxygen within the Pro inner shell assembly 930 into ozone (ozone saturation process) and is capable of being controlled by the Pro processor module 926. The plurality of Pro perforated trays 940 are sufficiently perforated to allow the free flow of air around any perishable item or biomass being stored within the Pro Neutral Atmosphere and Sanitization Storage Apparatus 900. The combined Pro humidity and temperature sensor 938 is mounted in close proximity to the Pro perforated trays 940 and measures humidity and temperature levels within the Pro inner shell assembly 930 and relays the measured data to the Pro processor module 926, so that the data may be used to trigger certain actions by the Pro processor module 926, such as turning the Pro UV light source 932 on or off, turning the Pro heating element 912 on or off, turning the Pro humidifier 935 on or off, sending one or more alerts, or the like. The plurality of load weight sensors 936 is mounted under the Pro perforated trays 940 and measures the weight of any perishable item or biomass being stored within the Pro Neutral Atmosphere and Sanitization Storage Apparatus 900 and relays the measured data to the Pro processor module 926, so that the data may be used to trigger certain actions by the Pro processor module 926, such as turning the Pro UV light source 932 on or off, turning the Pro heating element 912 on or off, turning the Pro humidifier 935 on or off, sending one or more alerts, or the like. The Pro fan 937 circulates the ambient air within the Pro inner shell assembly 930 in order to maximize its exposure to UV radiation during the ozone saturation process. The plurality of Pro perforated trays 940 holds perishable items or biomass within the Pro inner shell assembly 930, so that the perishable items or biomass are protected from direct exposure to UV radiation during the ozone saturation process, sufficiently exposed to the air within the Pro inner shell assembly 930 to benefit from ozone saturation, temperature control, and humidity control, and stores the perishable items or biomass in a region that is readily accessible when the Pro front door 916 is open.

The construction details of the invention as shown in FIG. 10, FIG. 11, FIG. 12, FIG. 13, FIG. 14, FIG. 15, FIG. 23, FIG. 24, FIG. 25, FIG. 26, FIG. 27, FIG. 28, and FIG. 29, are as follows. The Pro outer shell assembly 910, including the Pro front door 916, the Pro left side panel 965, the Pro right side panel 961, the Pro side door 950, the Pro rear panel 962, the Pro top panel 963, the Pro top access panel 954, and the Pro electronics cover 945; and the Pro inner shell assembly 930, including the Pro electronics shelf 933, comprise a strong, rigid, durable material, such as aluminum, metal, steel, glass, plastic, polycarbonate, composite material, ceramic, fiberglass, wood, or the like. The Pro power supply/UPS module 939 comprises a transformer, a 120 VAC power source, an electronic ballast, a battery pack, a uninterrupted power supply (UPS), a solar cell, or the like. The Pro processor module 926 comprises a compact wirelessly connected computer. The Pro locking latch 922, Pro solenoid lock 918, Pro solenoid assembly 913, and the Pro latch receiver 923, interact with the Pro processor module 926 and comprises a rigid, durable material such as aluminum, metal, steel, composite material, or the like. The Pro UV barrier 931 comprises a strong, rigid material that is opaque to UV radiation, such as wood, metal, or the like. The Pro side handles 971 and the Pro front handle 972 comprise a strong, rigid, durable material, such as aluminum, metal, steel, glass, plastic, polycarbonate, composite material, ceramic, fiberglass, wood, or the like. The Pro electronics ledge 957 comprises a strong, rigid, durable material, such as aluminum, metal, steel, glass, plastic, polycarbonate, composite material, ceramic, fiberglass, wood, or the like. The Pro exposure chamber cage 920, including the Pro u-bracket 927, comprises a strong, rigid material, such as aluminum, metal, steel, composite material, or the like. The Pro UV light source 932 comprises an incandescent light bulb that radiates UV light, florescent light bulb that radiates UV light, or a UV LED or an array of UV LEDs, as well as, the electrical connections for the bulb or emitter(s). The Pro fan 937 is a compact electrical component, which interacts with the Pro processor module 926 and the Pro power supply/UPS module 939, and comprises a durable material, such as aluminum, metal, steel, plastic, composite material, or the like. The combined Pro humidity and temperature sensor 938 is a compact electrical component, which interacts with the Pro processor module 926, and comprises a durable material, such as aluminum, metal, steel, plastic, composite material, or the like. The Pro humidifier 935 is a compact electrical component, which interacts with the Pro processor module 926 and the Pro power supply/UPS module 939, and comprises a durable material, such as aluminum, metal, steel, plastic, composite material, or the like. The Pro heating element 912 generates heat and is a compact electrical component, which interacts with the Pro processor module 926 and the Pro power supply/UPS module 939, and comprises a durable material, such as aluminum, metal, steel, plastic, composite material, or the like. The Pro touchscreen 915 is a compact electrical component, which interacts with the Pro processor module 926 and the Pro power supply/UPS module 939, and comprises a durable material, such as aluminum, metal, steel, glass, plastic, composite material, or the like. The Pro ballast 925 is a compact electrical component, which interacts with the Pro processor module 926 and the Pro power supply/UPS module 939, and comprises a durable material, such as aluminum, metal, steel, composite material, or the like. The load weight sensor 936 is a compact electrical component, which interacts with the Pro processor module 926, and comprises a durable material, such as aluminum, metal, steel, composite material, or the like. The plurality of Pro perforated trays 940 comprise a rigid perforated material, which allows free air flow through the Pro perforated trays 940, such as aluminum, metal, steel, plastic, composite material, wood, or the like. The Pro outer vent 914 comprise a rigid perforated material, which allows free air flow through the Pro outer vent 914, such as aluminum, metal, steel, plastic, composite material, wood, or the like. The Pro casters 934 comprise wheels and their supporting structure, and comprises rubber or plastic and a rigid durable material, such as aluminum, metal, steel, glass, plastic, polycarbonate, composite material, ceramic, fiberglass, wood, or the like. The materials listed herein are examples only and not intended to limit the scope of the present invention.

Referring now to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, and FIG. 29, in further detail, FIG. 10 depicts a diagram, which describes a preferred embodiment of a network configuration related to the Neutral Atmosphere and Sanitization Storage Apparatus 100, the Classic Neutral Atmosphere and Sanitization Storage Apparatus 800, and the Pro Neutral Atmosphere and Sanitization Storage Apparatus 900. The Neutral Atmosphere and Sanitization Storage Apparatus 100, the Classic Neutral Atmosphere and Sanitization Storage Apparatus 800, and the Pro Neutral Atmosphere and Sanitization Storage Apparatus 900, may be controlled through a web application 230 using a desktop computer or a mobile application 240 using a smartphone or tablet. Each Neutral Atmosphere and Sanitization Storage Apparatus 100, Classic Neutral Atmosphere and Sanitization Storage Apparatus 800, and Pro Neutral Atmosphere and Sanitization Storage Apparatus 900, may connect to network servers 210 through a firewall 220 using a Wi-Fi connection 260. Each running web application 230 connects to network servers 210 through a firewall 220 using an application network connection 250. The application network connection 250 comprises a wired network connection, a wireless connection, and/or a cellular connection. Similarly, each running mobile application 240 connects to network servers 210 through a firewall 220 using an application network connection 250. This network structure allows a Neutral Atmosphere and Sanitization Storage Apparatus 100, a Classic Neutral Atmosphere and Sanitization Storage Apparatus 800, or a Pro Neutral Atmosphere and Sanitization Storage Apparatus 900, in one location to be remotely controlled and/or monitored from any other location where an application network connection 250 can be established to access the network servers 210. After a user initially connects the system and enables network communications, the wirelessly networked processor module 126 automatically seeks out a Wi-Fi network and connects with network servers 210 using a Wi-Fi connection 260. The user then creates login information, registers the Neutral Atmosphere and Sanitization Storage Apparatus 100, the Classic Neutral Atmosphere and Sanitization Storage Apparatus 800, or the Pro Neutral Atmosphere and Sanitization Storage Apparatus 900, and sets preferences and alert settings for the apparatus. Network servers 210 record settings and begins to monitor the system and maintain diagnostic records on all tracked elements, including, but not limited to, relative humidity, ozone generation cycles, temperature, access (opening/closing) of the system, or the like. The Neutral Atmosphere and Sanitization Storage Apparatus 100, the Classic Neutral Atmosphere and Sanitization Storage Apparatus 800, or the Pro Neutral Atmosphere and Sanitization Storage Apparatus 900, provides a cloud-based monitoring system for all diagnostics and alerts generated for all deployed systems. Using a web application 230 on a desktop computer or a mobile application 240 on a smart phone (iOS or android), a user may monitor and/or control various aspects of the Neutral Atmosphere and Sanitization Storage Apparatus 100, the Classic Neutral Atmosphere and Sanitization Storage Apparatus 800, or the Pro Neutral Atmosphere and Sanitization Storage Apparatus 900, including, but not limited to, opening and closing the lids or doors, locking and unlocking the apparatuses, initiating preprogrammed treatment cycles, programming the decay periods between openings, monitoring the temperature and relative humidity (RH) within the airtight enclosures, recording the type of perishable items being stored, displaying or editing a user profile, accessing blogs or FAQs concerning recommendations for storing different types of perishable items, time, setting alerts, displaying the serial number or other identifying information of the apparatus, triggering a hard reset, activating off grid settings, or other custom attributes.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, and FIG. 29, in further detail, FIG. 15 depicts a diagram, which describes the most preferred embodiment of a network configuration related to the use of a single apparatus 700, such as a Neutral Atmosphere and Sanitization Storage Apparatus 100, the Classic Neutral Atmosphere and Sanitization Storage Apparatus 800, or the Pro Neutral Atmosphere and Sanitization Storage Apparatus 900, or of multiple apparatuses 710, including a collection of Neutral Atmosphere and Sanitization Storage Apparatuses 100, Classic Neutral Atmosphere and Sanitization Storage Apparatuses 800, or Pro Neutral Atmosphere and Sanitization Storage Apparatuses 900. The Neutral Atmosphere and Sanitization Storage Apparatus 100, the Classic Neutral Atmosphere and Sanitization Storage Apparatus 800, or the Pro Neutral Atmosphere and Sanitization Storage Apparatus 900, are primarily controlled through an application running on personal computers 770, smart phones 780 or tablets 790. Each Neutral Atmosphere and Sanitization Storage Apparatus 100, Classic Neutral Atmosphere and Sanitization Storage Apparatus 800, or Pro Neutral Atmosphere and Sanitization Storage Apparatus 900, uses a direct Wi-Fi connection 720 or direct Bluetooth connection 730 to connect directly to direct network servers 740. Encryption keys are stored within each unit for security. Each application running on personal computers 770, smart phones 780 or tablets 790, directly connects to direct network servers 740, as well. This network structure allows a Neutral Atmosphere and Sanitization Storage Apparatus 100, a Classic Neutral Atmosphere and Sanitization Storage Apparatus 800, or a Pro Neutral Atmosphere and Sanitization Storage Apparatus 900, in one location to be remotely controlled and/or monitored from any other location where a direct network connection to a direct network server 740 may be established by a personal computer 770, smart phone 780 or tablet 790. After a user initially connects the system and enables network communications, the wirelessly networked processor module 126, the Classic processor module 826, or the Pro processor module 926 automatically seeks out a Wi-Fi network and connects with direct network servers 740 using a direct Wi-Fi connection 720 or a direct Bluetooth connection 730. The user then creates login information, registers the apparatus, and sets preferences and alert settings for the apparatus. Direct Network servers 740 record settings and begins to monitor the system and maintain diagnostic records on all tracked elements, including, but not limited to, relative humidity, ozone generation cycles, temperature, weight, access (opening/closing) of the system, or the like. The Neutral Atmosphere and Sanitization Storage Apparatus 100, Classic Neutral Atmosphere and Sanitization Storage Apparatus 800, or Pro Neutral Atmosphere and Sanitization Storage Apparatus 900, provide cloud-based monitoring systems for all diagnostics and alerts generated for all deployed systems. Using an application on a personal computer 770, smart phone 780 or tablet 790, a user may monitor and/or control various aspects of the Neutral Atmosphere and Sanitization Storage Apparatus 100, Classic Neutral Atmosphere and Sanitization Storage Apparatus 800, or Pro Neutral Atmosphere and Sanitization Storage Apparatus 900, including, but not limited to, opening and closing the lid or door, locking and unlocking the apparatuses, initiating preprogrammed treatment cycles, programming the decay periods between openings, monitoring the temperature and relative humidity (RH) within the airtight enclosures, recording the type of perishable items or biomass being stored, recording and logging the weight of the perishable items or biomass displaying or editing a user profile, accessing blogs or FAQs concerning recommendations for storing different types of perishable items, time, setting alerts, displaying the serial number or other identifying information of the apparatuses, triggering a hard resets, activating off grid settings, or other custom attributes.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, and FIG. 29, in further detail, FIG. 11 depicts the initial configuration flow chart 300, which describes the process for setting up and configuring the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900. First, in the activation step 310, the user activates the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, either by using a web application 230 or mobile application 240, or an application running on a personal computer 770, smart phone 780 or tablet 790, or, in some embodiments, a manual switch on the apparatus. Next, in the network connection step 320, the user connects the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, to network servers 210 using a web application 230 or mobile application 240, or through a direct Wi-Fi connection 720 or a direct Bluetooth connection 730 to a direct network server 740. Next, in the registration step 330, the user registers the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, on the network servers 210 using a web application 230 or mobile application 240, or an application running on a personal computer 770, smart phone 780 or tablet 790, through a direct Wi-Fi connection 720 or a direct Bluetooth connection 730 to a direct network server 740. Next, in the settings decision step 340, the user decides whether to use the default settings of the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, or to change them. If the user decides to use the default settings, the web application 230 or mobile application 240; or an application running on a personal computer 770, smart phone 780 or tablet 790 through a direct Wi-Fi connection 720 or a direct Bluetooth connection 730 to a direct network server 740; loads the default settings into the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900; and the apparatus begins to track alerts for variations from the default settings, in the load system step 360. If the user decides to change the settings and use a configuration different from the default settings, the user accesses the web application 230 or mobile application 240; or an application running on a personal computer 770, smart phone 780 or tablet 790 through a direct Wi-Fi connection 720 or a direct Bluetooth connection 730 to a direct network server 740; and configures the settings to the desired monitoring levels, in the configure setting step 350. The Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, can monitor parameters and send alerts to the web application 230 or mobile application 240; or an application running on a personal computer 770, smart phone 780 or tablet 790 through a direct Wi-Fi connection 720 or a direct Bluetooth connection 730 to a direct network server 740; when a parameter substantially varies from its setting. The adjustable tracking and monitoring parameters comprise whether and when the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, is opened or closed, the number and frequency of ozone saturation process cycles, decay cycles, temperature levels, weights, relative humidity (RH) levels, type of perishable item being stored, user profile, the timing of events on the apparatuses, number of hard recycle orders, and information relevant to off grid operation. After the custom settings are configured, the web application 230 or mobile application 240; or an application running on a personal computer 770, smart phone 780 or tablet 790 through a direct Wi-Fi connection 720 or a direct Bluetooth connection 730 to a direct network server 740; loads the custom settings into the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, and apparatus begins to track alerts for variations from the custom settings, in the load system step 360. Once the load system step 360 is performed, the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, continues to monitor parameters for substantial variations from the recorded settings and sends alerts to the web application 230 or mobile application 240; or an application running on a personal computer 770, smart phone 780 or tablet 790 through a direct Wi-Fi connection 720 or a direct Bluetooth connection 730 to a direct network server 740; when a substantial variation occurs.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, and FIG. 29, in further detail, FIG. 12 shows the application/network control flow chart 400, which describes the interactions of the web application 230, mobile application 240, network servers 210; or an application running on a personal computer 770, smart phone 780 or tablet 790 through a direct Wi-Fi connection 720 or a direct Bluetooth connection 730 to a direct network server 740; and the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900. First, in the network ping step 410, the network servers 210 or direct network server 740 ping the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, through a firewall 220 using the wireless connection 260; or through a direct Wi-Fi connection 720 or a direct Bluetooth connection 730 to a direct network server 740. Next, in the box response step 420, the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, responds to the network servers 210 or direct network server 740, and provides updated values for all of the parameters that are being tracked to the network servers 210 or direct network servers 740. These tracked parameters comprise data regarding the opening and closing the lid, information relevant to locking and unlocking the apparatus, time and type of ozone saturation process or treatment cycles, decay periods between openings of the apparatus, temperature and relative humidity (RH) within the airtight enclosure, the type of perishable items or biomass being stored, weight of perishable items or biomass being stored, user profile information, time data, alert settings, the serial number or other identifying information of the apparatus, or other custom parameters. Once the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, has updated the network servers 210 or direct network server 740 with current tracking data, a user may access and view performance data using the web application 230 or the mobile application 240; or an application running on a personal computer 770, smart phone 780 or tablet 790 through a direct Wi-Fi connection 720 or a direct Bluetooth connection 730 to a direct network server 740; in the available data step 430. If the parameters that are updated to the network servers 210 or direct network servers 740 from the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, fall outside the settings that are saved on the network servers 210 or the direct network servers 740, the network servers 210 or direct network servers 740 generate an alert in the alert generation step 450, which is displayed on the web application 230 or the mobile application 240 or on an application running on a personal computer 770, smart phone 780 or tablet 790 connected to a direct network server 740 through a direct Wi-Fi connection 720 or a direct Bluetooth connection 730. Next, in the change decision step 460, a decision is made as to whether a change is required in response to a generated alert. If an alert requires a change to the system, in the adjustment step 440, adjustments to the setting or controls are sent from the web application 230 or mobile application 240, or an application running on a personal computer 770, smart phone 780 or tablet 790, to the network servers 210 or direct network server 740 through a direct Wi-Fi connection 720 or a direct Bluetooth connection 730; and then to the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900. If the apparatus receive a control adjustment directive, the appropriate elements of the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, are activated in order to manifest the desired change. For example, if an alert indicates that an ozone saturation process is recommended, the Neutral Atmosphere and Sanitization Storage Apparatus 100 receives a signal to activate an ozone saturation process as defined in the settings on the network servers 210. In the green metrics step 470, once the tracked parameters of the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, fall within settings on the network servers 210 or direct network server 740, any alerts are cleared, and no further action is required.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, and FIG. 29, in further detail, FIG. 13 illustrates the manual operation flow chart 500, which describes the process for the manual operation of the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900. First, in the new product step 510, a user opens the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, and places fresh perishable items or biomass into apparatus for treatment and storage and then closes the apparatus. Next, in the activate hard cycle step 520, using a web application 230 or mobile application 240; or an application running on a personal computer 770, smart phone 780 or tablet 790 through a direct Wi-Fi connection 720 or a direct Bluetooth connection 730; a user connects to network servers 210 or direct network server 740 and activates a user mandated hard cycle. Next, in the hard cycle confirmation step 530, the network servers 210, or direct network servers 740, receives the user mandated hard cycle request and alerts the user to the request, and, after the user confirms the request using the web application 230 or mobile application 240; or an application running on a personal computer 770, smart phone 780 or tablet 790 through a direct Wi-Fi connection 720 or a direct Bluetooth connection 730 to a direct network server 740; the network servers 210 or direct network server 740 activate the ozone saturation process on the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900. In the manual ozone saturation process step 540, in response to instructions from the network servers 210 or direct network servers 740, the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, activates the ozone saturation process. The ozone saturation process comprises turning on a UV light source and a fan for an amount of time; which are precisely calculated based on the volume of the apparatus, the type and/or weight of the perishable items being sanitized, or the like, and keyed to proprietary tables; or which are determined by custom settings. Too little ozone saturation will not properly sanitize the perishable items or biomass, and too much ozone saturation may damage the perishable items or biomass. Next, in the rest cycle step 550, the ozone saturation process completes, and the rest cycle for the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, commences. Next, in the new batch decision step 560, the user determines whether a new batch of fresh perishable items or biomass is available. If a new batch of fresh perishable items or biomass is available, the user begins the new product step 510. If a new batch of fresh perishable items is not available, the manual operation process is completed in the stop step 570.

Referring still to the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, and FIG. 29, in further detail, FIG. 14 shows the programmed operation flow chart 600, which describes the process for the programmed operation of the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900. First, in the set parameters step 610, the user uses the web application 230 or the mobile application 240; or an application running on a personal computer 770, smart phone 780 or tablet 790 connected through a direct Wi-Fi connection 720 or a direct Bluetooth connection 730 to a direct network server 740; to set the parameters and controls for the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, which are communicated to the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, through the network servers 210 or direct network servers 740 via a direct Wi-Fi connection 720 or a direct Bluetooth connection 730. Next, in the box response step 620, the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, accepts the settings for its parameters and controls from the network servers 210 or direct network servers 740, keeps track of the time, and automatically activates the ozone saturation process at the time scheduled in the settings. For instance, the default setting for the scheduled ozone saturation process may be every 30 days. Next, in the programmed ozone saturation process step 630, the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, activates the ozone saturation process. The ozone saturation process comprises turning on a UV light source and a fan for an amount of time; which are precisely calculated based on the volume of the apparatus, the type and/or weight of the perishable items being sanitized, or the like, and keyed to proprietary tables; or which are determined by custom settings. Next, in the no action step 640, if all system metrics are substantially within their set limits, the Neutral Atmosphere and Sanitization Storage Apparatus 100, the Classic Neutral Atmosphere and Sanitization Storage Apparatuses 800, or the Pro Neutral Atmosphere and Sanitization Storage Apparatuses 900, continues to keep time until the next ozone saturation process is scheduled.

The advantages of the present invention include, without limitation, that it provides a method, system and apparatus for storing perishable items that are frequently accessed, which sanitizes the perishable items and reduces their exposure to oxygen and/or humidity so that the perishable items maintain high quality for longer periods of time. The Neutral Atmosphere and Sanitization Storage Apparatus uses ozone generation to prevent parasitic infestation and oxygen degradation of perishable items and may use humidity and temperature control to prevent fungal growth. Moreover, the present invention's ability to take measurements and relay information to network servers help to identify conditions that would degrade the perishable items being stored as early as possible so that corrective action procedures may be activated to protect the perishable items from degradation.

In broad embodiment, the present invention relates generally to a storage container for storing perishable items that degrade in the presence of oxygen and/or humidity, comprising an openable storage container, which becomes airtight when closed, and an UV light source and fan within the airtight enclosure, which converts ambient oxygen trapped within the airtight enclosure into ozone, as well as, methods and systems for the same.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. An apparatus for storing perishable items that are frequently accessed, said apparatus comprising:
   an outer shell assembly, said outer shell assembly comprising
      an access door,
      a remote controlled lock, said remote controlled lock being able to lock said access door,
      an exposure chamber, said exposure chamber being able to be accessed through said access door and said exposure chamber being airtight when said access door is closed,
      an electronics chamber, said electronics chamber comprising a vent to the exterior of said outer shell assembly, and
      an exterior indicator;
   a memory stored in non-transitory computer-readable medium; said memory comprising
      tables of optimal ozone saturation for said perishable items, optimal temperature levels for said perishable items and optimal humidity for said perishable items;
   a processor module, said processor module enclosed within said electronics chamber and said processor module capable of wireless communication, said processor module capable of controlling said remote controlled lock to lock or unlock said access door, said processor module comprising
      said computer-readable medium;
   a power supply module, said power supply module enclosed within said electronics chamber;
   a UV light source, said UV light source enclosed within said exposure chamber and said UV light source being controllable by said processor module;

a perforated basket for storing said perishable items, said perforated basket enclosed within said exposure chamber and said perforated basket being sufficiently perforated to allow substantial air flow around said perishable items stored on said perforated basket;

a UV barrier, said UV barrier enclosed within said exposure chamber between said UV light source and said perforated basket, said UV barrier comprising
a material opaque to UV light;

a fan, said fan enclosed within said exposure chamber and said fan controllable by said processor module;

a temperature sensor, said temperature sensor enclosed within said exposure chamber and said temperature sensor being able to send measured temperature data to said processor module;

a humidity sensor, said humidity sensor enclosed within said exposure chamber and said humidity sensor being able to send measured humidity data to said processor module;

a humidity control unit, said humidity control unit enclosed within said exposure chamber and said humidity control unit controllable by said processor module;

wherein said apparatus receives said perishable items on to said perforated basket while said access door is open;

said processor module controls said remote controlled lock to lock said access door, thereby making said exposure chamber airtight;

said processor module receives said measured temperature data from said temperature sensor;

said processor module receives said measured humidity data from said humidity sensor;

said processor module accesses said tables in said memory and retrieves a recipe based on said perishable items, said measured temperature data, and said measured humidity data; and said processor module activates said humidity control unit to achieve said optimal humidity for said perishable items; and said processor module activates said UV light source and said fan, for a time based on retrieved said recipe, to circulate ambient air within said exposure chamber around said UV light source in order to generate ozone within said exposure chamber in an amount sufficient to achieve said optimal ozone saturation and to substantially preserve the quality of said perishable items.

2. An apparatus of claim 1, wherein said humidity control unit comprises a humidifier.

3. An apparatus of claim 1, wherein said humidity control unit comprises a humidity pack suspended within said exposure chamber.

4. An apparatus of claim 1, wherein said perforated basket comprises a plurality of perforated trays suspended within a cage, said cage comprising
a rigid frame,
a plurality of horizontal u-brackets mounted within said rigid frame,
wherein said perforated trays are supported by said u-brackets.

5. An apparatus of claim 1, said apparatus further comprising
a weight sensor, said weight sensor capable of measuring the weight of said perishable items and said weight sensor being able to send measured weight data to said processor module;

wherein said processor module accesses said tables in said memory and retrieves a recipe based on said measured weight data, in addition to said perishable items, said measured temperature data, and said measured humidity data.

6. An apparatus of claim 1, said apparatus further comprising a heating element, said heating element enclosed within said exposure chamber and said heating element controllable by said processor module.

7. An apparatus of claim 1, wherein said wireless communication is via Wi-Fi or Bluetooth.

8. An apparatus of claim 1, wherein said processor module connects directly to a network server through said wireless communication.

9. An apparatus of claim 1, wherein said processor module connects to a network server through a wireless device through said wireless communication, said wireless device comprising
a personal computer,
a desktop computer,
a smart phone, or
a tablet.

10. An apparatus of claim 1, wherein said memory is stored on a network server accessible by said processor module using said wireless communication.

11. An apparatus of claim 1, wherein said exterior indicator further comprises a touchscreen, said touchscreen controllable by said processor module.

12. A method of storing, curing, and preserving perishable items that are frequently accessed, said method comprising:
obtaining fresh said perishable items;
providing a memory stored in non-transitory computer-readable medium; said memory comprising
tables of optimal ozone saturation for said perishable items, optimal temperature levels for said perishable items and optimal humidity for said perishable items;
providing a processor module, said processor module comprising said memory and said processor module being capable of wireless communication;
enclosing said perishable items on a perforated basket within an airtight container along with a UV light source, a fan, a temperature sensor, a humidity sensor, a humidity control unit, and a UV barrier, which separates said perishable items from said UV light source; said UV light source, said humidity control unit, and said fan being controllable by said processor module; said temperature sensor being capable of sending measured temperature data to said processor module; and said humidity sensor being capable of sending measured humidity data to said processor module;
identifying said perishable items to said processor module;
measuring the temperature within said airtight container with said temperature sensor;
sending said measured temperature data to said processor module;
measuring the humidity within said airtight container with said humidity sensor;
sending said measured humidity data to said processor module;
accessing said tables in said memory with said processor module;
converting said measured temperature data and said measured humidity data to a recipe based on said perishable items and said tables with said processor module;

activating said UV light source and said fan, using said processor module, for a time based on said recipe;

activating said humidity control unit for a time based on said recipe; and circulating ambient air within said exposure chamber around said UV light source in order to generate ozone within said airtight container in an amount sufficient to achieve said optimal ozone saturation and to substantially preserve the quality of said perishable items.

13. The method of claim 12, wherein said humidity control unit comprises a humidifier.

14. The method of claim 12, said method further comprising enclosing a weight sensor within said airtight container, said weight sensor capable of measuring the weight of said perishable items and said weight sensor being able to send measured weight data to said processor module;

measuring the weight of said perishable items with said weight sensor;

sending said measured weight data to said processor module;

converting said measured weight data, along with said measured temperature data and said measured humidity data, to a recipe based on said perishable items and said tables;

wherein said processor module accesses said tables in said memory and retrieves said recipe based on said measured weight data, in addition to said perishable items, said measured temperature data, and said measured humidity data.

15. The method of claim 12, said method further comprising enclosing a heating element within said airtight container, said heating element being controllable by said processor module, and activating said heating element for a time based on said recipe to obtain said optimal temperature levels for said perishable items.

16. The method of claim 12, wherein said wireless communication is via Wi-Fi or Bluetooth.

17. The method of claim 12, wherein said processor module connects directly to a network server through said wireless communication.

18. The method of claim 12, wherein said processor module connects to a network server through a wireless device through said wireless communication, said wireless device comprising a personal computer,
a desktop computer,
a smart phone, or
a tablet.

19. The method of claim 12, wherein said memory is stored on a network server accessible by said processor using said wireless communication.

20. A system for storing, curing, and preserving perishable items that are frequently accessed, said system comprising:

said perishable items;
an apparatus of claim 1;
a wireless device, said wireless device comprising
a personal computer,
a desktop computer,
a smart phone, or
a tablet;
a network server, said network server accessible by said apparatus and by said wireless device;

wherein said apparatus is set up and initially configured by activating said apparatus using an application running on said wireless device or a manual switch on said apparatus, connecting said apparatus to said network server using said application, registering said apparatus on said network servers using said application, loading default settings for said apparatus and tracking default alerts for variations from said default settings, when said default settings are selected by a user, and configuring custom settings and tracking custom alerts for variations from said custom settings, when said custom settings are selected by said user;

wherein said apparatus interacts with said application by pinging said apparatus with said network server, sending a response from said apparatus to said network server with updated tracking parameters for said apparatus, sending said tracking parameters to said application on said wireless device for access and viewing by said user, generating an alert when said tracking parameters fall outside said default settings or said custom settings, and adjusting said custom settings by accessing said application on said wireless device, when dictated by said alert, and updating said custom settings on said apparatus until said alert is cleared;

wherein said apparatus is manually operated by opening said apparatus;
placing said perishable items within said apparatus;
closing said apparatus;
using said application to connect to said network servers and to activate a user-mandated hard cycle,
receiving said activation of said user-mandated hard cycle on said network server,
in response to said network servers, activating the ozone saturation process, said ozone saturation process comprising turning on said UV light source and said fan for an amount of time, which is precisely calculated based on the volume of said apparatus, the type and/or weight of said perishable items being sanitized and keyed to said tables, or which are determined by said custom settings, and
completing said ozone saturation process and entering a rest cycle until a new batch of said perishable items is available for sanitation; and wherein said apparatus undergoes programmed operation by using said application to set said tracking parameters and controls for said apparatus, accepting said tracking parameters and controls on said apparatus, automatically activating said ozone saturation process at the time scheduled by said controls, said ozone saturation process comprising turning on said UV light source and said fan for an amount of time; which is precisely calculated based on said volume of said apparatus, said type and/or said weight of said perishable items being sanitized and keyed to said tables, or which are determined by said custom settings, and keeping time on said apparatus until the next said ozone saturation process is scheduled.

* * * * *